(12) United States Patent
Martinez Tarradell et al.

(10) Patent No.: US 10,791,588 B2
(45) Date of Patent: Sep. 29, 2020

(54) TIMER CONFIGURATION TECHNIQUES FOR COVERAGE ENHANCEMENT

(71) Applicant: Apple Inc., Cupertino, CA (US)

(72) Inventors: Marta Martinez Tarradell, Hillsboro, OR (US); Richard Burbidge, Shrivenham (GB); Hyung-Nam Choi, Hamburg (DE); Seau Lim, Swindon (GB); Youn Hyoung Heo, Seoul (KR); Robert Zaus, Muchen (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/074,040

(22) PCT Filed: Feb. 6, 2017

(86) PCT No.: PCT/US2017/016739
§ 371 (c)(1),
(2) Date: Jul. 30, 2018

(87) PCT Pub. No.: WO2017/136843
PCT Pub. Date: Aug. 10, 2017

(65) Prior Publication Data
US 2019/0045581 A1 Feb. 7, 2019

Related U.S. Application Data

(60) Provisional application No. 62/292,121, filed on Feb. 5, 2016.

(51) Int. Cl.
*H04W 4/00* (2018.01)
*H04W 88/08* (2009.01)
(Continued)

(52) U.S. Cl.
CPC ............ *H04W 88/08* (2013.01); *H04L 1/0001* (2013.01); *H04L 1/08* (2013.01); *H04W 8/08* (2013.01);
(Continued)

(58) Field of Classification Search
CPC ....... H04W 88/08; H04W 76/27; H04W 8/08; H04W 8/24; H04W 80/08
See application file for complete search history.

(56) References Cited

U.S. PATENT DOCUMENTS

2016/0205659 A1* 7/2016 Bergman .............. H04L 1/1812
370/252
2016/0212636 A1* 7/2016 Dimou ................ H04W 56/001
(Continued)

FOREIGN PATENT DOCUMENTS

WO 2015117028 8/2015

OTHER PUBLICATIONS

3GPP TSG-RAN WG1 Meeting #83; R1-157788; LS on RRC parameters for LTE eMTC; Release 13; Source: RAN WG1; Anaheim, CA, USA; Nov. 15-22, 2015.
(Continued)

*Primary Examiner* — Abdelnabi O Musa

(57) ABSTRACT

Technology for user equipment (UE) and evolved NobeB (eNB) to support enhanced coverage is disclosed. If both the UE and eNodeB provide support for a first and second coverage enhancement (CE) mode, one or more timers of the UE, eNB and a core network (CN) can 5 be configured according to an extended timer range. However, if either the UE or the eNB does not provide support for both the first and second CE modes, the one or more timers of the UE, eNB and CN are configured according to a legacy timer range.

31 Claims, 9 Drawing Sheets

(51) Int. Cl.
<table>
<tr><td>H04L 1/00</td><td>(2006.01)</td></tr>
<tr><td>H04L 1/08</td><td>(2006.01)</td></tr>
<tr><td>H04W 76/27</td><td>(2018.01)</td></tr>
<tr><td>H04W 8/08</td><td>(2009.01)</td></tr>
<tr><td>H04W 8/24</td><td>(2009.01)</td></tr>
<tr><td>H04W 74/08</td><td>(2009.01)</td></tr>
<tr><td>H04W 88/02</td><td>(2009.01)</td></tr>
<tr><td>H04W 80/08</td><td>(2009.01)</td></tr>
</table>

(52) U.S. Cl.
CPC ......... *H04W 8/24* (2013.01); *H04W 74/0833* (2013.01); *H04W 76/27* (2018.02); *H04W 88/023* (2013.01); *H04W 80/08* (2013.01)

(56) References Cited

U.S. PATENT DOCUMENTS

2016/0338005 A1* 11/2016 Lim .................. H04W 4/70
2017/0181123 A1* 6/2017 Schliwa-Bertling .... H04W 4/70
2018/0352472 A1* 12/2018 Johansson ................. H04L 1/08

OTHER PUBLICATIONS

3GPP TSG RAN WG2 Meeting #91; R2-153337; Further Considerations on Paging for Coverage Enhancements UEs; Source: CATT; Beijing, CN; Aug. 24-28, 2015.

3GPP TSG-RAN2 Meeting #91bis; R2-154448; Considerations on coverage enhancement level; Source: LG Electronics Inc.; Malmo, Sweden; Oct. 5-9, 2015.

3GPP TSG-RAN WG2 #92; Tdoc R2-156778; Email discussion report on [91bis#17][LTE/MTC] Timers; Source: Ericsson; Anaheim, CA, USA; Nov. 16-20, 2015.

3GPP TSG RAN WG2 Meeting #92; R2-156886; LS on RRC parameters for LTE eMTC; Source RAN WG1; Anaheim, CA, USA; Nov, 16-20, 2015.

3GPP TSG RAN WG2 NB-IOT Ad-hoc Meeting; R2-160404; LS on Extended coverage impact on NAS timers; Source: CT1; Budapest, Hungary; Jan. 19-21, 2016.

3GPP TSG-RAN WG2 #93; Tdoc R2-161086; Change Request; Addition of low complexity UEs and coverage enhancement features; Source: Ericsson; Malta; Feb. 15-19, 2016.

3GPP TSG RAN WG3 Meeting #59; R3-080180; Signalling of eNB Security capabilities; Source: Nokia; Sorrento, IT; Feb. 11-15, 2008.

* cited by examiner

TIMER CONFIGURATION TECHNIQUES FOR COVERAGE ENHANCEMENT

BACKGROUND

Wireless communication technology uses various standards and protocol to transmit data between a node (e.g. a transmission station) and a wireless device (e.g., a mobile device). As wireless mobile communication technology continues to develop, greater bandwidth is needed for the increasing amount of data transmitted from an increasing number of devices. The types of devices using wireless communication technology is increasing from traditional cell phones, tablet computers and laptop computers, to include devices such as smart meters, connected appliances, vehicular infotainment system, self-driving vehicles, wearable devices, remote sensing devices and the like. The devices can be mobile, or deployed in fixed locations, and can be operating from open spaces, inside offices and homes, deep in basements, and the like. To service the growing number of uses for wireless communication technology, there is a growing need for wireless communication technologies that provide for lower complexity devices for use in low cost applications, that provide improved power savings for extending battery life, and provide extended coverage for servicing devices located in poor communication channel conditions such as deep inside buildings and other structures.

To extend coverage a number of technologies can be utilized, including power boosting, extensive coding, advanced repetition schemes, frequency hopping, and the like. In advanced repetition schemes, data can be sent multiple times over the wireless communication link. Because interference on the communication link tends to be time variant, bit errors in the data being transmitted multiple times will likely occur in different locations from one repetition of the data to another. Therefore, by comparing the data from multiple repetitions, the errors caused by interference on the communication link can be detected and corrected by the devices. While advanced repetition schemes can compensate for interference, increasing the number of repetition of transmissions can also deleteriously increase bandwidth congestion, increase power consumption, increase transmission latency and the like.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
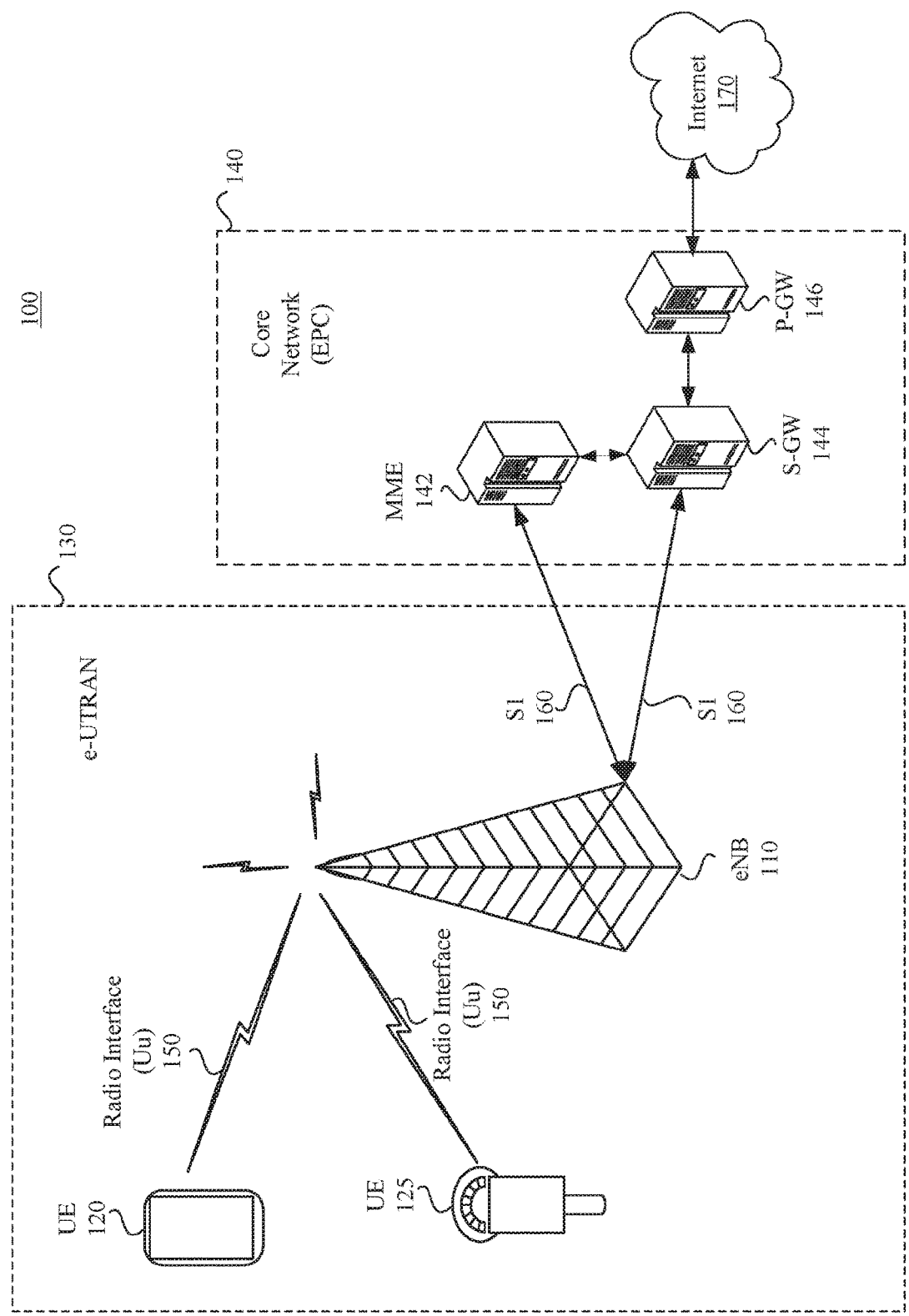
FIG. 1 depicts a wireless system, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, an Internet-of-things (IoT) device such as a smart meter, an autonomous device such as a self-driving vehicle or other type of computing device that provides text or voice communication. The term "User Equipment (UE)" may also be refer to as a "mobile device," "wireless device," of "wireless mobile device."

As used herein, the term "Evolved NodeB," "eNodeB," or "eNB," refers to a device or configured node of a mobile phone network that communicates wirelessly with UEs.

As used herein, the term "cellular telephone network' or "Long Term Evolved (LTE)" refers to wireless broadband technology developed by the Third-Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, a wireless system can include a core network (CN), one or more evolved eNodeB (eNB) and one or more user equipment (UE) device. The UE and eNB can indicate, to the CN, a coverage enhancement (CE) mode supported by each device. The CN can determine an operating mode based upon the CE mode supported by the eNB and the UE. The operating mode can be one of a first CE mode or a second CE mode. The first CE mode can be associated with a first number of repetitions used to receive and transmit messages between the eNB and the UE. The second CE mode can be associated with a second number of repetitions for each message, wherein the second number of repetitions is greater than the first number of repetitions. The CN can transmit an indication of the determined operating mode to the eNB and the UE. The CN, eNB and UE can each respectively define one or more of its timers based on the determined operating mode.

Because the number of repetitions used to transmit messages can impact the range of one or more timers, the present technology provides for configuring the affected timers. Embodiments of the present technology advantageously provide granularity for specifying a range of one or more timers depending upon the particular CE mode. The granularity for specifying a range of the one or more timers can be used to achieve a desired balance between enhanced coverage, bandwidth utilization, transmission latency, power consumption, device complexity and the like.

FIG. 1 depicts a wireless system, in accordance with an example. In one aspect, the wireless system 100 can include one or more Long Term Evolved (LTE) evolved NodeBs (eNB) 110, one or more User Equipment (UE) devices 120, 125 of an evolved universal mobile telecommunications system terrestrial radio access network (e-UTRAN) 130, and one or more core networks (CN) 140. In one instance, the one or more UEs 120, 125 can be coupled to the eNB 110 by a radio interface (Uu) 150. In one instance, the one or more UEs 120, 125 can include one or more of a smart phone, a tablet computing device, a laptop computer, an internet of things (IOT) device, and/or another type of computing device that can be configured to provide digital wireless communications.

As used herein, digital wireless communications can include data and/or voice communications, as well as control information. In one instance, the digital wireless communications can be in accordance with the Third-Generation Partnership Project (3GPP) Long Term Evolved (LTE) standards. In one aspect, the digital communications can support enhanced Machine Type Communication (eMTC). In one instance, the wireless system 100 can support a plurality of user equipment categories, including category 1 (Cat 1) through Cat 16, and a plurality of enhanced communication configurations, including Cat 0, and Cat m1. Each UE category defines a combined uplink and downlink capability for the UE operating in the UE category.

In one aspect, the eNB 110 can be coupled to the CN 140 by one or more communication user plane interfaces (S1, S1-u, S1-MME) 160. In one aspect, the CN 140 can be an Evolved Packet Core (EPC) network including one or more Mobility Management Entities (MME) 142, one or more Serving Gateways (S-GW) 144, one or more Public data network Gateway (P-GW) 146 and other networks and computing systems. The MME 142 can be the control node that processes the signaling between the one or more UEs 120, 125 and the CN 140. The MME 142 provides for idle mode UE paging and tagging including retransmissions. The MME 142 provides for bearer activation/deactivation, and choosing the S-GW 144 for a UE at initial attach and during handover. The MME 142 supports user authentication with a Home Subscriber Server (HSS) (not shown). Non-Access Stratum (NAS) signaling terminates at the MME 142. The S-GW 144 routes and forwards user data packets and manages and stores UE contexts, while also acting as the mobility anchor for the user plane during handovers. The P-GW 146 provides connectivity from the one or more UEs 120, 125 to external packet data networks. In one aspect, the CN 140 may be coupled to one or more additional networks, such as the Internet 170.

Figure 2:
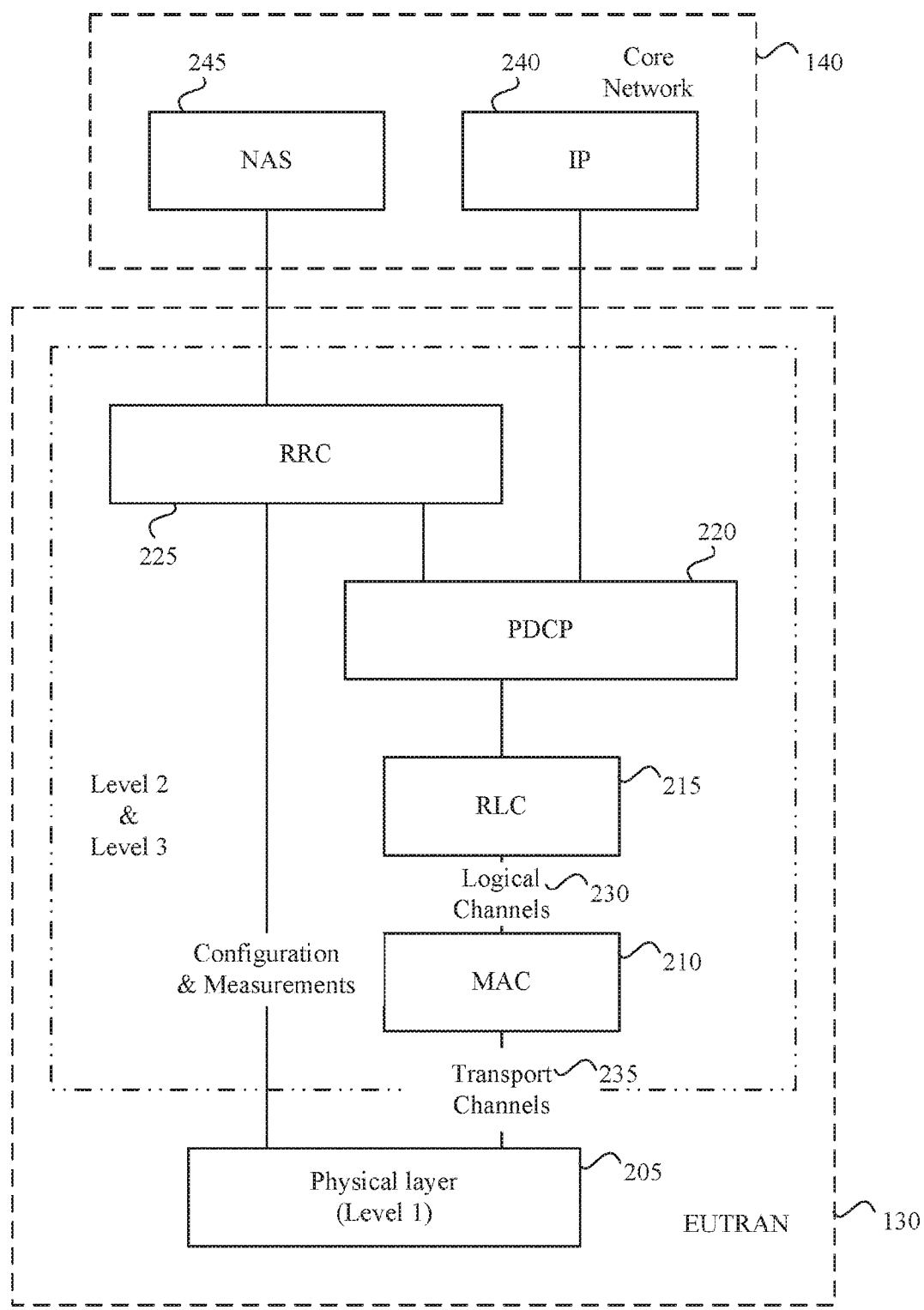
FIG. 2 depicts a protocol stack of an evolved universal mobile telecommunications system terrestrial radio access network (e-UTRAN), in accordance with an example.

FIG. 2 depicts a protocol stack of the e-UTRAN 130, in accordance with an example. In one aspect, the e-UTRAN 130 can include a physical layer 205, a medium access control (MAC) 210, a radio link control (RLC) 215, a packet data convergence protocol (PDCP) 220, and a radio resource control (RRC) 225. The physical layer 205, at level 1 (L1) of the protocol stack, can carry information from the MAC transport channels over the air interface. The physical layer 205 can take care of adaptive modulation and coding (AMC), power control, initial synchronization and handover cell search, and intra and inter system measurements for the RRC layer 225. The MAC 210 sublayer, at levels 2 and 3 (L2 & L3) of the protocol stack, can offer a set of logical channels 230 to the RLC 215 sublayer that it multiplexes into the physical layer transport channels 235. The MAC 210 can also manage the HARQ error correction, handles the prioritization of the logical channels 230 for the same UE 125 and the dynamic scheduling between UEs 120, 125. The RLC 215, at L2 and L3, transports the PDCP's 220 PDUs. The RLC 215 can work in three different modes depending on the reliability provided. Depending upon the mode, the RLC 215 can handle automatic repeat request ARQ error correction, segmentation/concatenation of PDUs, reordering for in-sequence delivery, and duplicate detection. The PDCP 220, at L2 and L3, can provide transport of data for the RRC 225 with ciphering and integrity protection. The PDCP 220 can provide the IP layer 240 transport of IP packets, with robust header compression ROHC header compression, ciphering, and depending on the RLC mode in-sequence delivery, duplicate detection and retransmission of its own SDUs during handover. The RRC 225 can handle broadcast system information related to the access stratum and transport of the non-access stratum (NAS) 245 messages, paging, establishment and release of the RRC connection, security key management, handover, UE measurements related to inter-system (inter-RAT) mobility and quality of service (QoS).

Referring again to FIG. 1, the eNB 110 in one aspect can encode a message indicating a coverage enhancement (CE) mode supported by the eNB 110 for transmission to a core node (CN) 140. The CE mode supported by the eNB 110 can be encoded in an eNB capability message. In one aspect, a UE 125 can encode a message indicating a coverage enhancement (CE) mode supported by the UE 125 for transmission to the core node (CN) 140. The CE mode supported by the UE 125 can be encoded in a UE capability message. In one example, the CE mode supported by the UE 125 can be encoded with subscription information in a container for transmission to the eNB 110. In another example, the CE mode supported by the UE 125 can be encoded in a capability message within a container for transmission to the eNB 110. The eNB 110 can transmit the container to the CN 140.

In one example, the UE 120 may support one or more 3GPP user equipment categories (UE-categories). Each UE-category can be characterized by a combination of maximum level one (L1) downlink data rate, maximum number of downlink multiple input multiple output (MIMO) layers, and maximum uplink data rate. For example, Table 1 includes some of the performance characteristics for 3GPP UE-categories Cat m1 and Cat 0 through Cat 16.

TABLE 1

| ue-category | Max L1 DL data rate (Mbits/se) | Max Number of DL MIMO layers | Max L1 UL data rate (Mbits/s) |
|---|---|---|---|
| M1 | 1.0 | 1 | 1.0 |
| 0 | 1.0 | 1 | 1.0 |
| 1 | 10.3 | 1 | 5.2 |
| 2 | 51.0 | 2 | 25.5 |
| 3 | 102.0 | 2 | 51.0 |
| 4 | 150.8 | 2 | 51.0 |
| 5 | 299.6 | 4 | 75.4 |
| 6 | 301.5 | 2 or 4 | 51.0 |
| 7 | 301.5 | 2 or 4 | 102.0 |
| 8 | 2,998.6 | 8 | 1,497.8 |
| 9 | 452.2 | 2 or 4 | 51.0 |
| 10 | 452.2 | 2 or 4 | 102.0 |
| 11 | 603.0 | 2 or 4 | 51.0 |
| 12 | 603.0 | 2 or 4 | 102.0 |
| 13 | 391.7 | 2 or 4 | 150.8 |
| 14 | 3,917 | 8 | N/A |
| 15 | 750 | 2 or 4 | N/A |
| 16 | 979 | 2 or 4 | N/A |

Cat M1 is considered coverage enhancement mode UE-category that at least supports a first CE mode. The other UE-categories can optionally support a first CE mode, first and second CE modes, or not. The CE modes may provide increased coverage utilizing repetitive transmission, new physical channel formats, or similar techniques. When additional repetitions for each message is used, the impact on the range of one or more timers can be affected. In addition, the number of repetitions can be different for different communications levels (e.g., L1/L2/L3). Future releases of the 3GPP standard may include additional CE modes.

In one instance, the UE 125 and eNB 110 can indicate a lowest CE mode that each device supports. For example, if the UE 125 indicates that it supports a first CE mode, the UE 125 does not support a second CE mode. However, if the UE 125 indicates that it supports the second CE mode, it also supports the first CE mode.

In one aspect, the CN 140 can determine an operating mode based upon the CE mode supported by the eNB 110 and the CE mode supported by the UE 125. For example, the CN 140 can determine the operating mode based upon the supported CE mode of the eNB 110 and the UE 125, as illustrated in Table 2.

TABLE 2

| eNB support | UE support | Operating mode |
|---|---|---|
| First CE mode supported (but not the second CE mode) | Any CE mode | First CE mode (but not the second CE mode) |
| Both first and second CE modes supported | First CE mode supported, but not the second CE mode | First CE mode (but not the second CE mode) |
| | Both first and second CE modes supported | First CE mode or second CE mode |

If the eNB 110 and UE 125 both support the first CE mode (but not the second CE mode), the CN 140 determines that the operating mode for the eNB 110 and UE 125 should be the first CE mode. If the eNB 110 supports the first CE mode and the UE 125 supports second CE mode, the CN 140 determines that the operating mode for the eNB 110 and UE 125 should be the first CE mode. If the eNB 110 supports the second CE mode and the UE 125 supports the first CE mode, the CN 140 determines that the operating mode for the eNB 110 and the UE 125 should be the first CE mode. If the eNB 110 and the UE 125 both support the second CE mode, the CN 140 may determine that the operating mode for the eNB 110 and the UE 125 can be either the first or second CE mode. It is to be appreciated that although the operating mode can be the second CE mode when both the eNB 110 and the UE 125 support the second CE mode, the CN 140 may determine that the operating mode should be the first CE mode instead based upon one or more other configuration parameters.

In one aspect, the CN 140 can encode the operating mode in a configuration message for transmission to the UE 125 and to the eNB 110. The operating mode can be provided in a UE context container that the MME sends the eNB over S1 signaling, for example with establishing an RRC connection. The determined operating mode can be similarly encoded by the CN 140 in a configuration message to the eNB 110. The operating mode can be encoded in an X2 or S1 signaling.

In one aspect, the CN 140 can define one or more timers of the CN 140 according to a legacy timer range when the operating mode is a first CE mode. The CN 140 can, alternatively, be configured to define the one or more timers of the CN 140 according to an extended timer range when the operating mode is a second CE mode. The CN 140 can, alternatively, define the one or more timers of the CN 140 according to the legacy timer range when the operating mode is a non-CE mode. In one aspect, the one or more timers can include one or more level 2 or level 3 protocol stack timers. In one aspect, the CN 140 can configure itself operate the one or more defined timers based on the operating mode.

The first CE mode can be considered a shallow CE level and the second CE mode can be considered a deep CE level. The shallow CE level can be utilized in poor channel conditions, providing support of UE mobility and CSI feedback for link adaptation. For example, the shallow CE level can be utilized for UE devices located inside structures. The deep CE level can be utilized in extremely poor channel conditions, providing support of limited UE mobility and no CSI feedback. For example, the deep CE level can be utilized for UE devices located deep in the basements of structures.

In one aspect, the eNB 110 can decode the configuration message received from the CN 140 that includes the operating mode. The operating mode can be broadcast with information by the radio access network (RAN) node to the UE or the NAS signaling from the CN to the UE. In one aspect, the eNB 110 can define one or more timers of the eNB 110 according to a legacy timer range when the operating mode is a first CE mode. The eNB 110 can, alternatively, define the one or more timers of the eNB 110 according to an extended timer range when the operating mode is a second CE mode. The eNB 110 can, alternatively, define the one or more timers of the eNB 110 according to the legacy timer range when the operating mode is a non-CE mode. In one aspect, the one or more timers can include one or more level 2 or level 3 protocol stack timers. In one aspect, the eNB 110 can configure itself to operate the one or more defined timers based on the operating mode received from the CN 140.

In one aspect, the UE 125 can decode the configuration message received from the CN 140 that includes the operating mode. In one aspect, the UE 125 can define one or more timers of the UE 125 according to a legacy timer range when the operating mode is a first CE mode. The UE 125 can, alternatively, define the one or more timers of the UE 125 according to an extended timer range when the operating mode is a second CE mode. The UE 125 can, alternatively, define the one or more timers of the UE according to the legacy timer range when the operating mode is a non-CE mode. In one aspect, the one or more timers can include one or more level 2 or level 3 protocol stack timers. In one aspect, the UE 125 can configure itself to operate the one or more defined timers based on the operating mode received from the CN 140.

In one instance, the one or more timers can include one or more non-access stratum (NAS) 245 timers, one or more access stratum (AS) timers, one or more control plane timers, one or more radio resource control (RRC) 225 timers, one or more radio link control (RLC) 215 timers, one or more packet data convergence protocol (PDCP) 220 timers, or one or more random access channel (RACH) timers. For example, one or more timers, such as T300, T301 and T304, in the first CE mode may be configured for repetitions up to 2 seconds (sec). The one or more timers can by extended in the second CE mode to repetitions up to 10 sec. In one example, the random access response (ra-Response) WindowSize timer may be extended from a maximum of 10 milliseconds (ms) for the first CE mode, to a maximum of 400 ms for the second CE mode. The macContentionResolutionTimer can be extended from a maximum of 64 ms for the first CE mode, to a maximum of 240 ms for the second CE mode. In RLC, a poll retransmit timer, which is also referred to as the T-PollRetransmit timer, can be extended from a maximum of 500 ms for the first CE mode, to a maximum of 4 sec for the second CE mode. A reordering timer, also referred to as the T-Reordering, can be extended from a maximum of 200 ms for the first CE mode, to a maximum of 1.6 sec for the second CE mode. A status prohibit timer, also referred to as the t-StatusProhibit can be extended from a maximum of 500 ms for the first CE mode, to a maximum of 2.4 sec for the second CE mode. In one instance, the one or more timers of the CN can include one or more timers of the MME, one or more timers of the S-GW, or one or more timers of the P-GW.

Figure 3:
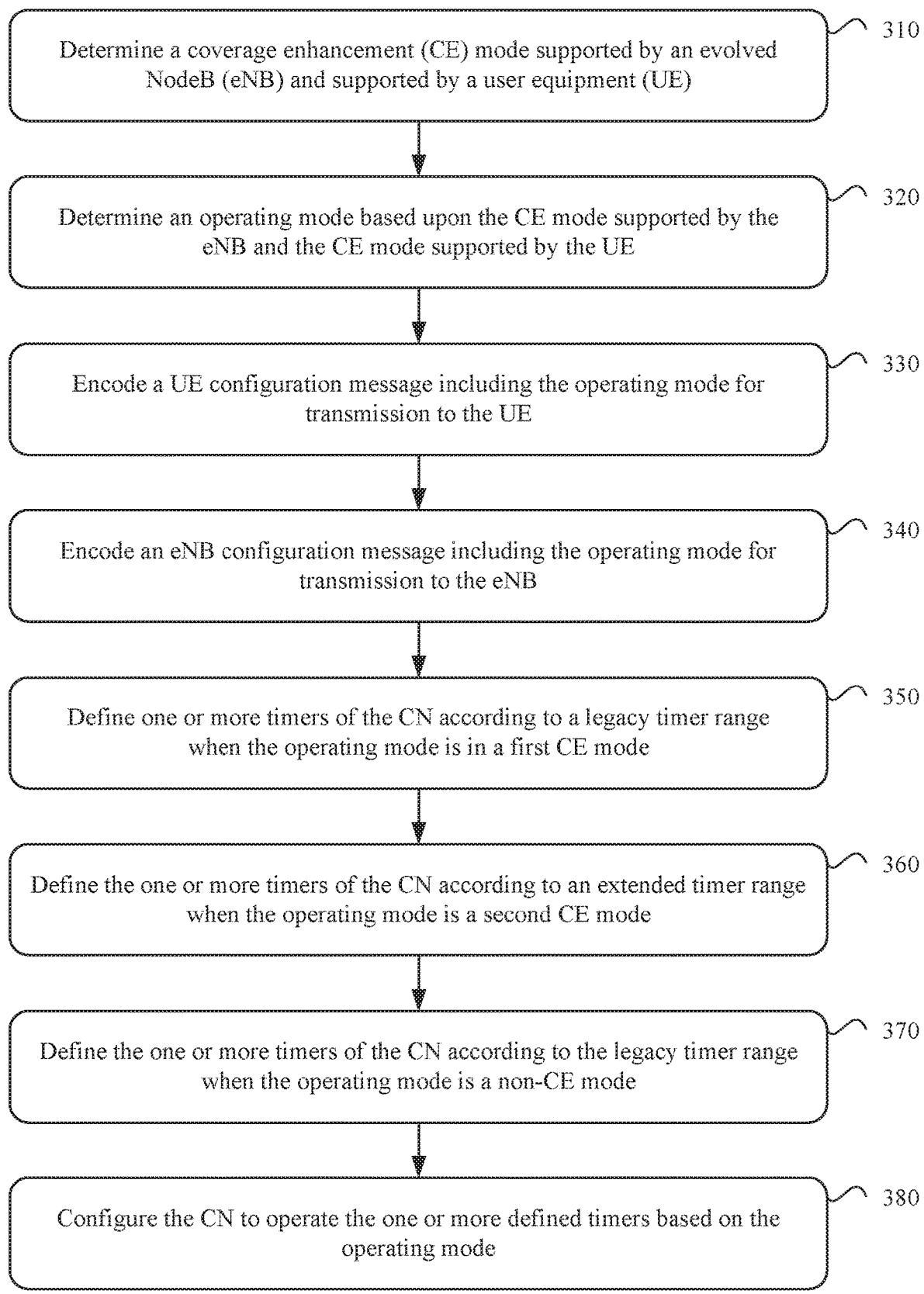
FIG. 3 illustrates functionality of a core network (CN) to facilitate coverage enhancement, in accordance with an example.

FIG. 3 illustrates functionality of a core network (CN) to facilitate coverage enhancement, in accordance with an example. In one aspect, the CN can be an evolved packet core (EPC). In one aspect, the functionality of the CN can include determining a coverage enhancement (CE) mode supported by an evolved NodeB (eNB) and a CE mode supported by a user equipment (UE) 310. In one instance, determining the CE mode supported by the eNB can include decoding a message received by the CN from the eNB indicating the CE mode supported by the eNB. In one instance, determining the CE mode supported by the UE can include decoding a message received by the CN from the eNB indicating the CE mode supported by the UE. In another instance, determining the CE mode supported by the UE can include decoding a subscription information message in a container received by the CN from the eNB indicating the CE mode supported by the UE. In yet another instance, determining the CE mode supported by the UE can include decoding a UE capability message in a container received by the CN from the eNB indicating the CE mode supported by the UE.

In one aspect, the CN can determine an operating mode based upon the CE mode supported by the eNB and the CE mode supported by the UE 320. For example, the CN can determine the operating mode based upon the supported CE mode of the eNB and the UE, as illustrated in Table 2. If the eNB supports the first CE mode but not the second CE mode, the operating mode can be determined to be the first CE mode by the CN, regardless of the CE mode supported by the UE. Likewise, if the UE supports the first CE mode but not the second CE mode, the operating mode can be determined to be the first CE mode by the CN, regardless of the CE mode supported by the eNB. However, if both the eNB and the UE support both the first CE mode and the second CE mode, the operating mode can be determined to be the first CE mode by the CN. In one aspect, the CN can encode a UE configuration message including the determined operating mode for transmission to the UE 330. In one aspect, the CN can also encode an eNB configuration message including the operating mode for transmission to the eNB 340. In one aspect, the operating mode can include one of the first CE mode, the second CE mode, or one of a plurality of non-CE mode.

In one aspect, the CN can define one or more timers of the CN, for the eNB and the UE, according to a legacy timer range when the operating mode is a first CE mode 350. The CN can alternatively, define the one or more timers of the CN according to an extended timer range when the operating mode is a second CE mode 360. The CN can, alternatively, define the one or more timers of the CN according to the legacy timer range when the operating mode is a non-CE mode 370. In one aspect, the CN can configure itself to operate the one or more defined timers based on the determined operating mode, 380.

In one instance, the one or more timers of the CN can include one or more non-access stratum (NAS) layer timers, one or more access stratum (AS) layer timers, one or more control plane timers, one or more radio resource control (RRC) timers, one or more radio link control (RLC) timers, one or more packet data convergence protocol (PDCP) timers, or one or more random access channel (RACH) timers. In one instance, the one or more timers are defined for a respective UE configuration or for a respective CN configuration.

In one aspect, the first CE mode is associated with communications where a number of repetitions used to receive and transmit messages between the eNB and the UE is within a first range, and the second CE mode is associated with communications where the number of repetitions used to receive and transmit messages between the eNB and the UE is within a second range, wherein the second range is greater than the first range. For example, the number of repetitions in the first CE mode may be up to 32 repetition, and the number of repetitions in the second CE mode may be up to 256 repetition. The actual number of repetitions may be greater than or less than these example values for the first CE mode and the second CE mode, depending on variables such as system configuration, UE location, desired or required QoS, and so forth.

In one instance, the first CE mode can be utilized for non-repetition based communications or communications using a relatively small number of repetitions. For example, in the first CE mode one or more timers may be set for cat 0 communications. In one instance, the second CE mode can be utilized for communications using a relatively large number of repetitions. For example, in the second CE mode one or more timers may be set for cat M1 communications. The non-CE modes may include any one of cat 1 through cat 16 as set forth in Table 1.

Figure 4:
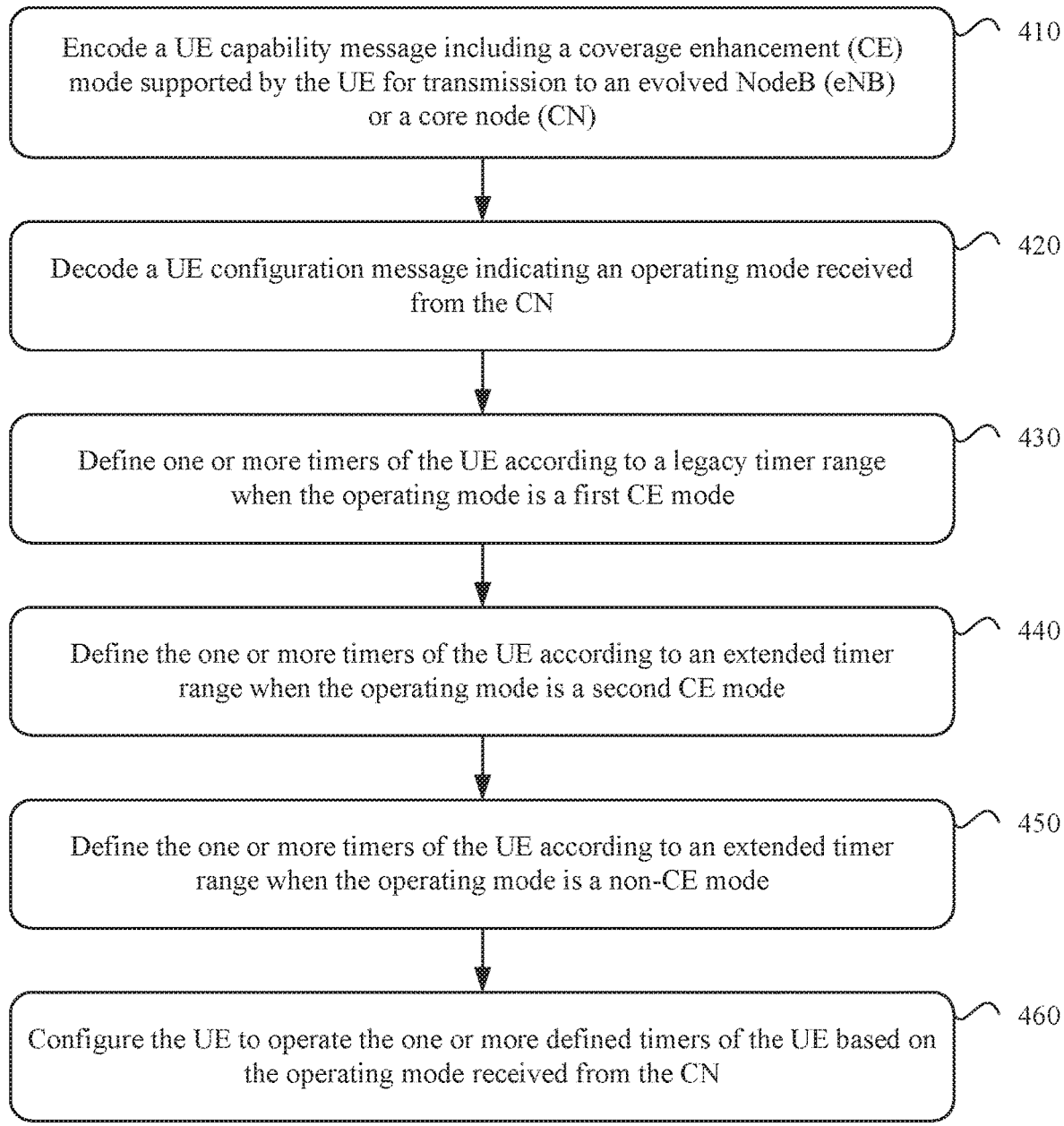
FIG. 4 illustrates functionality of a user equipment (UE) to facilitate coverage enhancement, in accordance with an example.

FIG. 4 illustrates functionality of a user equipment (UE) to facilitate coverage enhancement, in accordance with an example. In one aspect, the UE can be a smart phone, a tablet computing device, a laptop computer, an internet of things (IOT) device, and/or another type of computing device that is configured to provide digital communications.

In one aspect, the functionality of the UE can include encoding a UE capability message including a coverage enhancement (CE) mode supported by the UE for transmission to an evolved NodeB (eNB) or a core node (CN) 410. In one instance, encoding the CE mode supported by the UE for transmission to the eNB or the core node CN can include encoding a subscription information message in a container. In another instance, encoding the CE mode supported by the UE for transmission to the eNB or a CN can include encoding a capability message in a container.

In one aspect, the UE can decode a UE configuration message indicating an operating mode received from the CN 420. In one aspect, the operating mode can include one of the first CE mode, the second CE mode, or one of a plurality of non-CE modes.

In one aspect, the UE can define one or more timers of the UE according to a legacy timer range when the operating mode is a first CE mode 430. The UE can, alternatively, define the one or more timers of the UE according to an extended timer range when the operating mode is a second CE mode 440. The UE can, alternatively, define the one or more timers of the UE according to the legacy timer range when the operating mode is a non-CE mode 450. In one aspect, the UE can configure itself to operate the one or more defined timers based on the determined operating mode, 460.

In one instance, the one or more timers can include one or more radio link control (RLC) timers, one or more packet data convergence protocol (PDCP) timers, or one or more random access channel (RACH) timers. In one instance, the one or more timers are defined for a respective UE configuration or for a respective CN configuration.

In one aspect, the first CE mode is associated with communications where a number of repetitions for each message used to receive and transmit messages between the eNB and the UE is within a first range, and the second CE mode is associated with communications where the number of repetitions for each message used to receive and transmit messages between the eNB and the UE is within a second range, wherein the second range is greater than the first range. For example, the number of repetitions in the first CE mode may be up to 32 repetition, and the number of repetitions in the second CE mode may be up to 256 repetition.

In one instance, the first CE mode can be utilized for non-repetition based communications or communications using a relatively small number of repetitions. For example, in the first CE mode one or more timers may be set for cat 0 communications. In one instance, the second CE mode can be utilized for communications using a relatively large number of repetitions. For example, in the second CE mode one or more timers may be set for cat M1 communications. The non-CE modes may include any one of cat 1 through cat 16 as set forth in Table 1.

Figure 5:
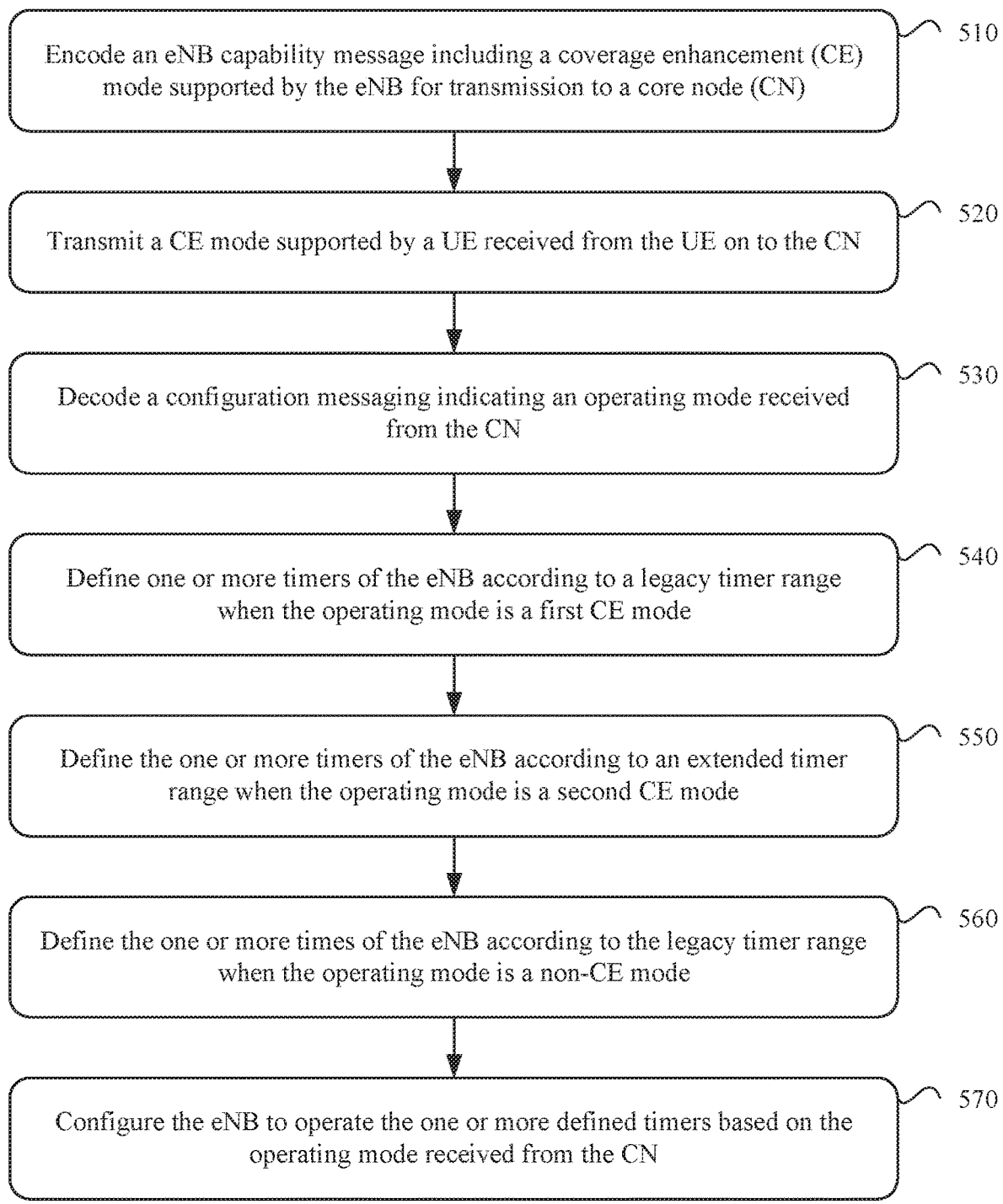
FIG. 5 illustrates functionality of an evolved NodeB (eNB) to facilitate coverage enhancement, in accordance with an example.

FIG. 5 illustrates functionality of an evolved NodeB (eNB) to facilitate coverage enhancement, in accordance with an example. In one aspect, the eNB can be a base station in accordance with the Third-Generation Partnership Project (3GPP) Long Term Evolved (LTE) standards.

In one aspect, the functionality of the eNB can include encoding an eNB capability message including a coverage enhancement (CE) mode supported by the eNB for transmission to a core node (CN) 510. In one aspect, the eNB can also transmit a CE mode supported by a User Equipment (UE) device, received from the UE, on to the CN 520. In one instance, the eNB can receive a container from the UE including a message indicating the CE mode supported by the UE. The eNB can forward the container including the message indicating the CE mode supported by the UE to the CN. In another instance, the eNB can decode a subscription message or capability message received from the UE indicating the CE mode supported by the UE. The eNB can then encode the CU mode supported by the UE in a capability message for transmission to the CN.

In one aspect, the eNB can decode an operating mode received from the CN 530. In one aspect, the operating mode can include one of the first CE mode, the second CE mode, or one of a plurality of non-CE mode.

In one aspect, the eNB can define one or more timers of the eNB according to a legacy timer range when the operating mode is a first CE mode 540. The eNB can, alternatively, define the one or more timers of the eNB according to an extended timer range when the operating mode is a second CE mode 550. The UE can, alternatively, define the one or more timers of the eNB according to the legacy timer range when the operating mode is a non-CE mode 560.

In one instance, the one or more timers can include one or more radio resource control (RRC) timers, one or more radio link control (RLC) timers, one or more packet data convergence protocol (PDCP) timers, or one or more random access channel (RACH) timers. In one instance, the one or more timers are defined for a respective UE configuration or for a respective CN configuration.

In one aspect, the first CE mode is associated with communications where a number of repetitions used to receive and transmit messages between the eNB and the UE is within a first range, and the second CE mode is associated with communications where the number of repetitions used to receive and transmit messages between the eNB and the UE is within a second range, wherein the second range is greater than the first range. For example, the number of repetitions in the first CE mode may be up to 32 repetition, and the number of repetitions in the second CE mode may be up to 256 repetition.

In one instance, the first CE mode can be utilized for non-repetition based communications or communications using a relatively small number of repetitions. For example, in the first CE mode one or more timers may be set for cat 0 communications. In one instance, the second CE mode can be utilized for communications using a relatively large number of repetitions. For example, in the second CE mode one or more timers may be set for cat M1 communications. The non-CE modes may include any one of cat 1 through cat 16 as set forth in Table 1.

Figure 6:
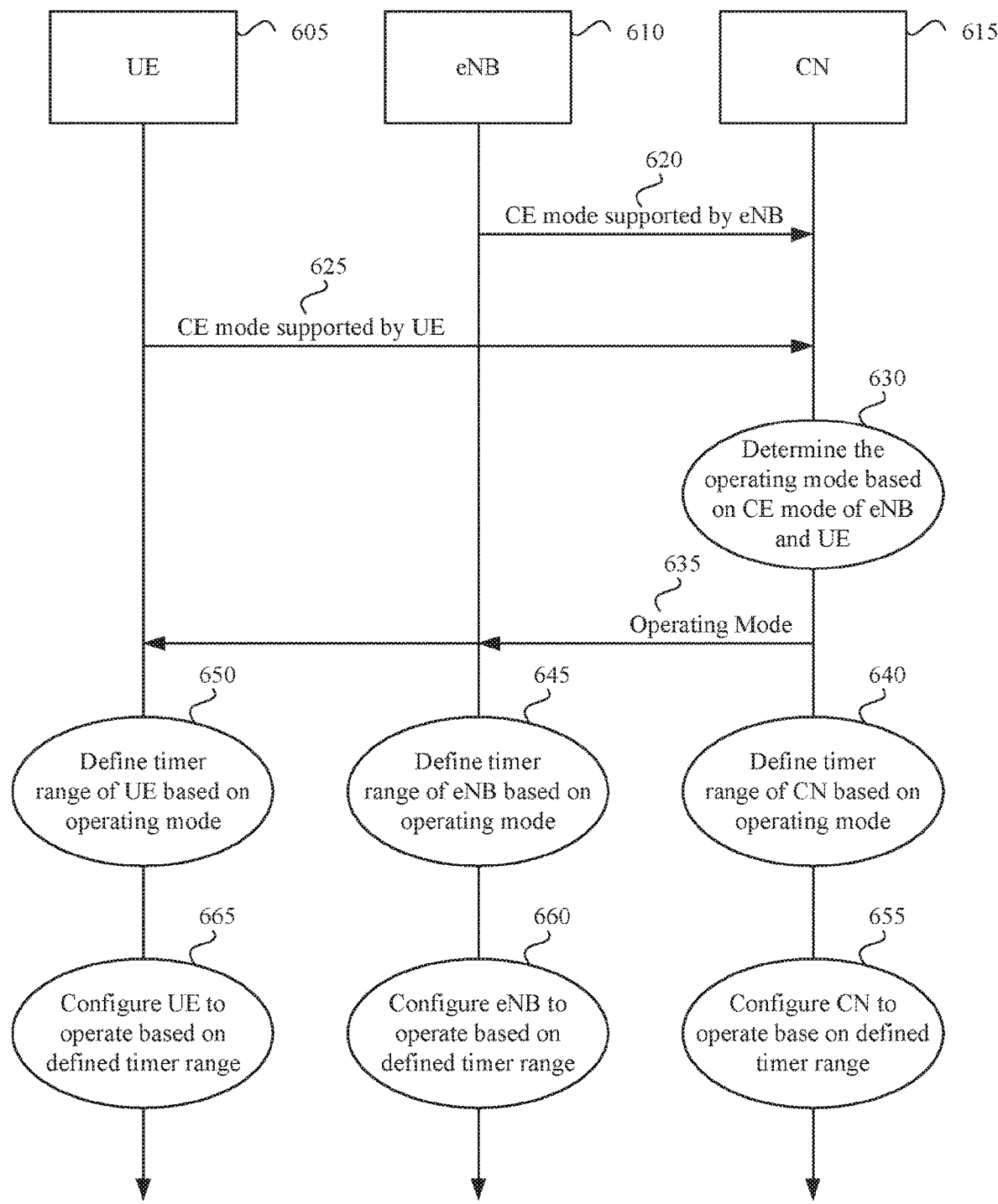
FIG. 6 depicts configuration of a wireless system for supporting coverage enhancement functionality, in accordance with an example.

FIG. 6 depicts configuration of a wireless system for supporting coverage enhancement functionality, in accordance with an example. In one aspect, the wireless system includes one or more User Equipment (UE) devices 605, one or more evolved NodeBs (eNB) 610 and a core network (CN) 615. In one instance, the UEs 610 can include one or more of a smart phone, a tablet computing device, a laptop computer, an internet of things (IOT) device, and/or another type of computing device that is configured to provide digital communications. In one instance, the eNBs 610 can be a base station in accordance with the Third-Generation Partnership Project (3GPP) Long Term Evolved (LTE) standards. In one instance, the CN 615 can be an Evolved Packet Core (EPC) network.

In one aspect, the eNB 610 can be configured to encode a message indicating a coverage enhancement (CE) mode 620 supported by the eNB 610 for transmission to the CN 615. In one aspect, the UE 605 can be configured to encode a message indicating the CE mode supported 625 by the UE 605 for transmission to the CN 615. In another aspect, the UE 605 can be configured to encode a message indicating the CE mode supported 625 by the UE 605 for transmission to the eNB 610, and the eNB 610 can be configured to forward the message onto the CN 615. In one instance, the CE mode supported 625 by the UE 605 can be encoded with subscription information in a container for transmission to the eNB 610. In another instance, the CE mode supported 625 by the UE 605 can be encoded in a capability message in a container for transmission to the eNB 610. The eNB 610 can transmit the container onto the CN 615.

In one aspect, the CN 615 can be configured to determine an operating mode 630 based upon the CE mode supported 620 by the eNB 610 and the CE mode supported 625 by the UE 605. In one instance, the determined operating mode can be one of a first CE mode, a second CE mode, or one of a plurality of non-CE modes. In one instance, when the eNB or UE supports a second CE mode, the eNB or UE also supports the second CE mode. In one aspect, the CN 615 can be configured to encode the operating mode 635 for transmission to the UE 605 and to the eNB 610.

In one aspect, the CN 615 can define one or more timers 640 of the CN 615 based on the determined operating mode 635. The eNB 610 can also define one or more timers 645 of the eNB 610 based on the determined operating mode 635. The UE can also define one or more timers 650 of the UE 605 based on the determined operating mode 635. In instance, one or more timers of the CN, the eNB, and the UE can be defined according to a legacy timer range when the operating mode is a first CE mode. Alternatively, the one or more timers of the CN, the eNB, and the UE can be defined according to an extended timer range when the operating mode is a second CE mode. Alternatively, the one or more timers of the CN, the eNB, and the UE can be defined according to the legacy timer range when the operating mode is a non-CE mode. In one instance, the one or more timers can include one or more non-access stratum (NAS) layer timers, one or more access stratum (AS) layer timers, one or more control plane timers, one or more radio resource control (RRC) timers, one or more radio link control (RLC) timers, one or more packet data convergence protocol (PDCP) timers, or one or more random access channel (RACH) timers.

In one aspect, the first CE mode can be associated with communications where a number of repetitions for each message used to receive and transmit messages between the eNB and the UE is within a first range, and the second CE mode is associated with communications where the number of repetitions for each message used to receive and transmit messages between the eNB and the UE is within a second range, wherein the second range is greater than the first range.

In one aspect, the CN 615 can configure itself to operate based on the defined timer range 655. The eNB 610 can also configure itself to operate based on the defined timer range 660. The UE 605 can also configure itself to operate based on the defined timer range 665.

Embodiments of the present technology advantageously provide granularity for specifying a range of one or more timers depending upon the particular CE mode. The granularity can support enhanced coverage for mode that can impact the range of the one or more timers.

Figure 7:
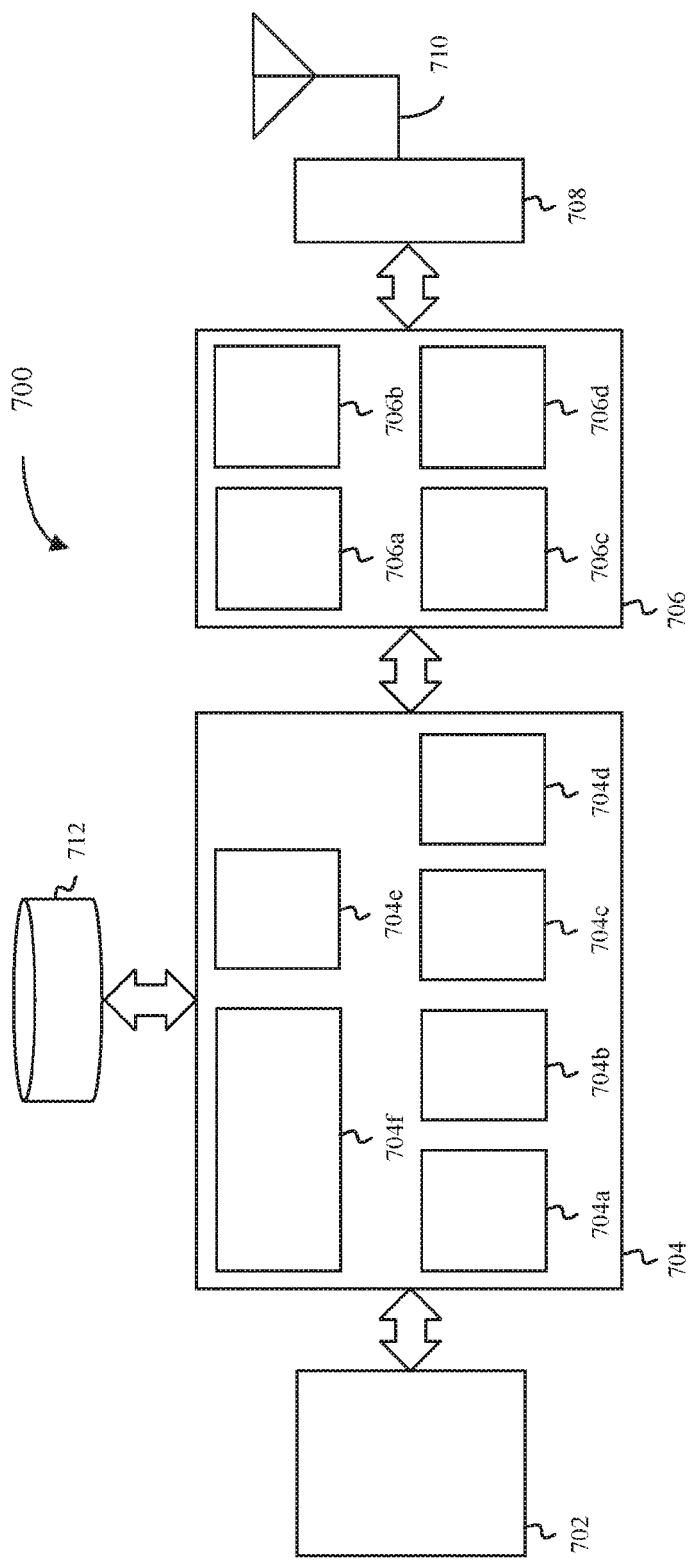
FIG. 7 illustrates a diagram of example components of a UE in accordance with an example.

FIG. 7 illustrates a diagram of example components of a User Equipment (UE) device in accordance with an example. In some aspects, the UE device 700 can include application circuitry 702, baseband circuitry 704, Radio Frequency (RF) circuitry 706, front-end module (FEM) circuitry 708 and one or more antennas 710, coupled together at least as shown.

The application circuitry 702 can include one or more application processors. For example, the application circuitry 702 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 712, and can be configured to execute instructions stored in the storage medium 712 to enable various applications and/or operating systems to run on the system.

The baseband circuitry 704 can include circuitry such as, but not limited to, one or more single-core or multi-core processors. The baseband circuitry 704 can include one or more baseband processors and/or control logic to process baseband signals received from a receive signal path of the RF circuitry 706 and to generate baseband signals for a transmit signal path of the RF circuitry 706. Baseband processing circuitry 704 can interface with the application circuitry 702 for generation and processing of the baseband signals and for controlling operations of the RF circuitry 706. For example, in some aspects, the baseband circuitry 704 can include a second generation (2G) baseband processor 704$a$, third generation (3G) baseband processor 704$b$, fourth generation (4G) baseband processor 704$c$, WiFi baseband processor 704$d$ and/or other baseband processor(s) 704$e$ for other existing generations, generations in development or to be developed in the future (e.g., fifth generation (5G), 6G, etc.). The baseband circuitry 704 (e.g., one or more of baseband processors 704$a$-$d$) can handle various radio control functions that enable communication with one or more radio networks via the RF circuitry 706. The radio control functions can include, but are not limited to, signal modulation/demodulation, encoding/decoding, radio frequency shifting, etc. In some aspects, modulation/demodulation circuitry of the baseband circuitry 704 can include Fast-Fourier Transform (FFT), precoding, and/or constellation mapping/demapping functionality. In some aspects, encoding/decoding circuitry of the baseband circuitry 704 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 704 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704$f$ of the baseband circuitry 704 can be configured to run elements of the protocol stack for signaling of the PHY, MAC, RLC, PDCP and/or RRC layers. In some aspects, the baseband circuitry can include one or more audio digital signal processor(s) (DSP) 704$g$. The audio DSP(s) 704$g$ can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 704 and the application circuitry 702 can be implemented together such as, for example, on a system on a chip (SOC).

In some aspects, the baseband circuitry 704 can provide for communication compatible with one or more radio technologies. For example, in some aspects, the baseband circuitry 704 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 704 is configured to support radio communications of more than one wireless protocol can be referred to as multi-mode baseband circuitry.

RF circuitry 706 can enable communication with wireless networks using modulated electromagnetic radiation through a non-solid medium. In various aspects, the RF circuitry 706 can include switches, filters, amplifiers, etc. to facilitate the communication with the wireless network. RF circuitry 706 can include a receive signal path which can include circuitry to down-convert RF signals received from the FEM circuitry 708 and provide baseband signals to the baseband circuitry 704. RF circuitry 706 can also include a transmit signal path which can include circuitry to up-convert baseband signals provided by the baseband circuitry 704 and provide RF output signals to the FEM circuitry 708 for transmission.

In some aspects, the RF circuitry 706 can include a receive signal path and a transmit signal path. The receive signal path of the RF circuitry 706 can include mixer circuitry 706a, amplifier circuitry 706b and filter circuitry 706c. The transmit signal path of the RF circuitry 706 can include filter circuitry 706c and mixer circuitry 706a. RF circuitry 706 can also include synthesizer circuitry 706d for synthesizing a frequency for use by the mixer circuitry 706a of the receive signal path and the transmit signal path. In some aspects, the mixer circuitry 706a of the receive signal path can be configured to down-convert RF signals received from the FEM circuitry 708 based on the synthesized frequency provided by synthesizer circuitry 706d. The amplifier circuitry 706b can be configured to amplify the down-converted signals and the filter circuitry 706c can be a low-pass filter (LPF) or band-pass filter (BPF) configured to remove unwanted signals from the down-converted signals to generate output baseband signals. Output baseband signals can be provided to the baseband circuitry 704 for further processing. In some aspects, the output baseband signals can be zero-frequency baseband signals, although the output baseband signals do not have to be zero-frequency baseband signals. In some aspects, mixer circuitry 706a of the receive signal path can comprise passive mixers, although the scope of the aspects is not limited in this respect.

In some aspects, the mixer circuitry 706a of the transmit signal path can be configured to up-convert input baseband signals based on the synthesized frequency provided by the synthesizer circuitry 706d to generate RF output signals for the FEM circuitry 708. The baseband signals can be provided by the baseband circuitry 704 and can be filtered by filter circuitry 706c. The filter circuitry 706c can include a low-pass filter (LPF), although the scope of the aspects is not limited in this respect.

In some aspects, the mixer circuitry 706a of the receive signal path and the mixer circuitry 706a of the transmit signal path can include two or more mixers and can be arranged for quadrature down conversion and/or up conversion respectively. In some aspects, the mixer circuitry 706a of the receive signal path and the mixer circuitry 706a of the transmit signal path can include two or more mixers and can be arranged for image rejection (e.g., Hartley image rejection). In some aspects, the mixer circuitry 706a of the receive signal path and the mixer circuitry 706a can be arranged for direct down conversion and/or direct up conversion, respectively. In some aspects, the mixer circuitry 706a of the receive signal path and the mixer circuitry 706a of the transmit signal path can be configured for superheterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 706 can include analog-to-digital converter (ADC) and digital-to-analog converter (DAC) circuitry and the baseband circuitry 704 can include a digital baseband interface to communicate with the RF circuitry 706.

In some dual-mode embodiments, a separate radio IC circuitry can be provided for processing signals for each spectrum, although the scope of the embodiments is not limited in this respect.

In some embodiments, the synthesizer circuitry 706d can be a fractional-N synthesizer or a fractional N/N+1 synthesizer, although the scope of the embodiments is not limited in this respect as other types of frequency synthesizers can be suitable. For example, synthesizer circuitry 706d can be a delta-sigma synthesizer, a frequency multiplier, or a synthesizer comprising a phase-locked loop with a frequency divider.

The synthesizer circuitry 706d can be configured to synthesize an output frequency for use by the mixer circuitry 706a of the RF circuitry 706 based on a frequency input and a divider control input. In some embodiments, the synthesizer circuitry 706d can be a fractional N/N+1 synthesizer.

In some embodiments, frequency input can be provided by a voltage controlled oscillator (VCO), although that is not a constraint. Divider control input can be provided by either the baseband circuitry 704 or the applications processor 702 depending on the desired output frequency. In some embodiments, a divider control input (e.g., N) can be determined from a look-up table based on a channel indicated by the applications processor 702.

Synthesizer circuitry 706d of the RF circuitry 706 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 706 can include an IQ/polar converter.

FEM circuitry 708 can include a receive signal path which can include circuitry configured to operate on RF signals received from one or more antennas 710, amplify the received signals and provide the amplified versions of the received signals to the RF circuitry 706 for further processing. FEM circuitry 708 can also include a transmit signal path which can include circuitry configured to amplify signals for transmission provided by the RF circuitry 706 for transmission by one or more of the one or more antennas 710.

In some embodiments, the FEM circuitry 708 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 706). The transmit signal path of the FEM circuitry 708 can include a power amplifier (PA) to amplify input RF signals (e.g., provided by RF circuitry 706), and one or more filters to generate RF signals for subsequent transmission (e.g., by one or more of the one or more antennas 710.

In some embodiments, the UE device 700 can include additional elements such as, for example, memory/storage, display, camera, sensor, and/or input/output (I/O) interface.

Figure 8:
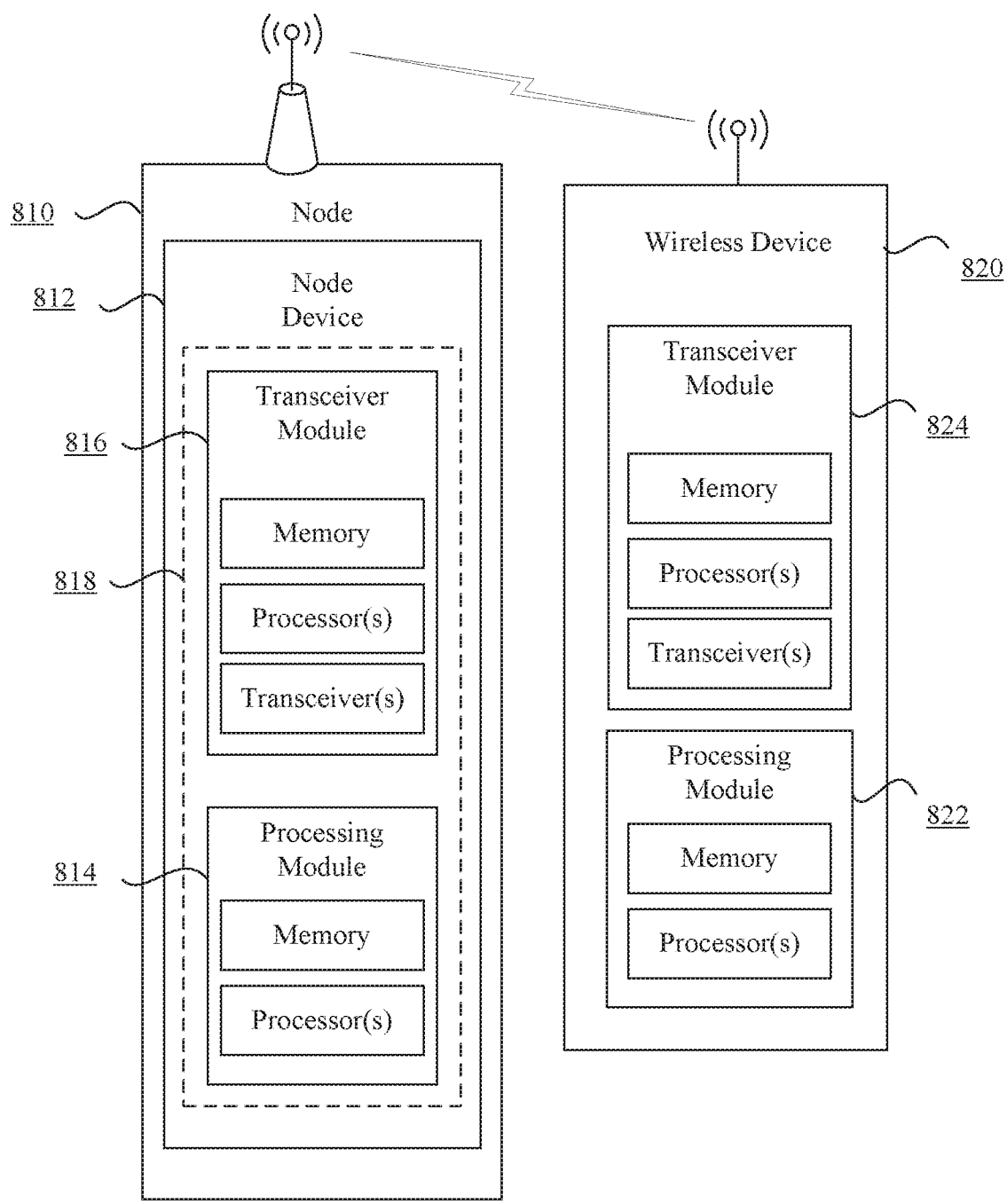
FIG. 8 illustrates a diagram of an eNB and UE in accordance with an example.

FIG. 8 illustrates a diagram 800 of a node 810 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 810 can include a node device 812. The node device 812 or the node 810 can be configured to communicate with the wireless device 820. The node device 812 can be configured to implement the technology described. The node device 812 can include a processing module 814 and a transceiver module 816. In one aspect, the node device 812 can include the transceiver module 816 and the processing module 814 forming a circuitry 818 for the node 810. In one aspect, the transceiver module 816 and the processing module 814 can form a circuitry of the node device 812. The processing module 814 can include one or more processors and memory. In one embodiment, the processing module 822 can include one or more application processors. The transceiver module 816 can include a transceiver and one or more processors and memory. In one embodiment, the transceiver module 816 can include a baseband processor.

The wireless device 820 can include a transceiver module 824 and a processing module 822. The processing module 822 can include one or more processors and memory. In one embodiment, the processing module 822 can include one or more application processors. The transceiver module 824 can include a transceiver and one or more processors and memory. In one embodiment, the transceiver module 824 can include a baseband processor. The wireless device 820 can be configured to implement the technology described.

The node 810 and the wireless devices 820 can also include one or more storage mediums, such as the transceiver module 816, 824 and/or the processing module 814, 822. In one aspect, the components described herein of the transceiver module 816 can be included in one or more separate devices that can be used in a cloud-RAN (C-RAN) environment.

Figure 9:
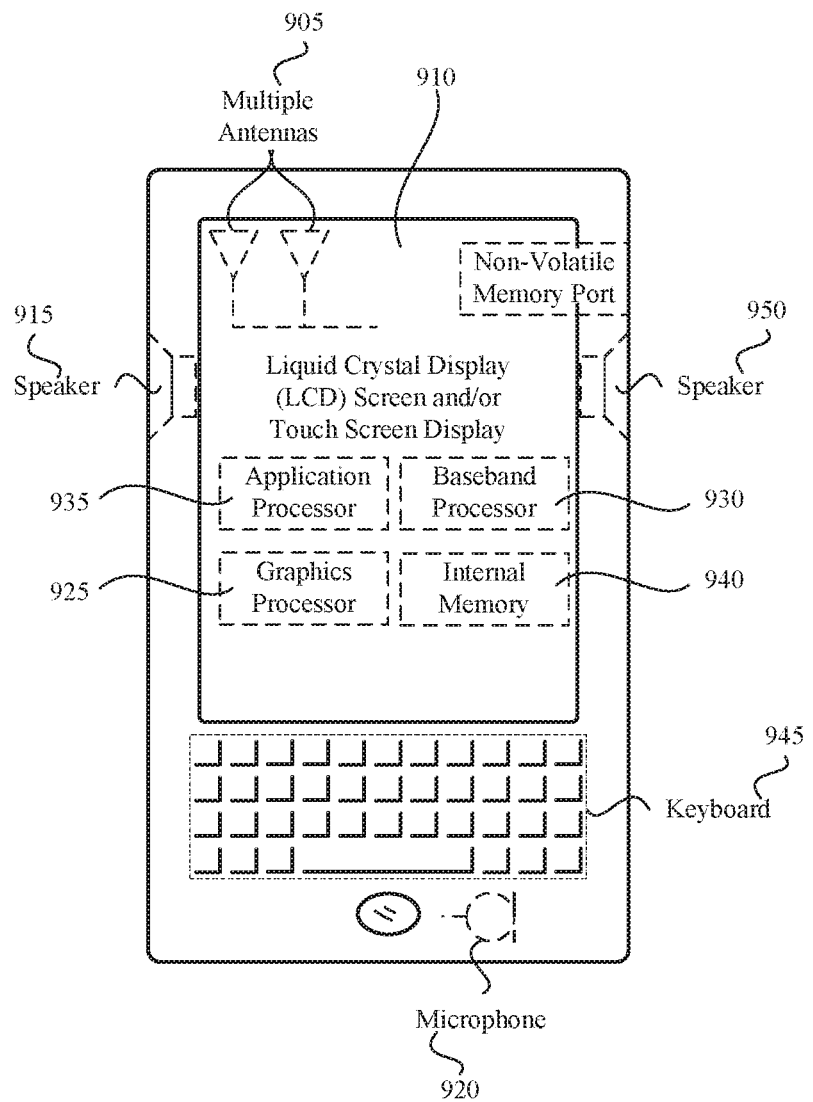
FIG. 9 illustrates a diagram of example components of a UE in accordance with an example.

FIG. 9 illustrates a diagram of a UE 900, in accordance with an example. The UE may be a mobile station (MS), a mobile wireless device, a mobile communication device, a tablet, a handset, or other type of wireless device. In one aspect, the UE 900 can include at least one of an antenna 905, a touch sensitive display screen 910, a speaker 915, a microphone 920, a graphics processor 925, a baseband processor 930, an application processor 935, internal memory 940, a keyboard 945, a non-volatile memory port 950, and combinations thereof.

The UE can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

EXAMPLES

The following examples pertain to specific technology embodiments and point out specific features, elements, or steps that may be used or otherwise combined in achieving such embodiments.

Embodiment 1 includes an apparatus of a user equipment (UE) operable to support enhanced coverage for communicating data, the apparatus comprising memory; and one or more processors configured to: encode a UE capability message including a coverage enhancement (CE) mode supported by the UE for transmission to an evolved NodeB (eNB) or a core node (CN); decode a UE configuration message indicating an operating mode received from the CN, wherein the operating mode includes one of a first CE mode or a second CE mode; define one or more timers of the UE according to a legacy timer range when the operating mode is the first CE mode; define the one or more timers of the UE according to an extended timer range when the operating mode is the second CE mode; and configure the UE to operate the one or more defined timers of the UE based on the operating mode received from the CN.

Embodiment 2 includes the apparatus of embodiment 1, wherein the one or more processors are further configured to: define the one or more timers of the UE according to the legacy timer range when the operating mode is a non-CE mode, wherein the operating mode further includes the non-CE mode.

Embodiment 3 includes the apparatus of embodiments 1 or 2, wherein, the first CE mode is associated with communications where a number of repetitions for each message used to receive and transmit messages between the UE and an evolved NodeB (eNB) is within a first range; and the second CE mode is associated with communications where the number of repetitions for each message used to receive and transmit messages between the UE and the eNB UE is within a second range, wherein the second range is greater than the first range.

Embodiment 4 includes the apparatus of embodiment 1, wherein the one or more timers include one or more radio link control (RLC) timers, one or more packet data convergence protocol (PDCP) timers, or one or more random access channel (RACH) timers.

Embodiment 5 includes the apparatus of embodiments 1 or 4, wherein the one or more timers include one or more level 2 or level 3 protocol stack timers.

Embodiment 6 includes the apparatus of embodiment 1, wherein when the UE supports the second CE mode the UE also supports the first CE mode.

Embodiment 7 includes the apparatus of embodiment 1, wherein encoding the UE capability message including the CE mode supported by the UE for transmission to the eNB or the CN includes encoding a subscription information message in a container.

Embodiment 8 includes the apparatus of embodiment 1, wherein encoding the UE capability message including the CE mode supported by the UE for transmission to the eNB or a CN includes encoding the UE capability message in a container.

Embodiment 9 includes the apparatus of embodiment 1, wherein the one or more timers are defined for a respective UE configuration or for a respective CN configuration.

Embodiment 10 includes an apparatus of an evolved NodeB (eNB) operable to support enhanced coverage for communicating data, the apparatus comprising memory; and one or more processors configured to: encode an eNB capability message including a coverage enhancement (CE) mode supported by the eNB for transmission to a core node (CN); decode a configuration message indicating an operating mode received from the CN, wherein the operating mode includes one of a first CE mode or a second CE mode; define one or more timers of the eNB for a user equipment (UE) according to a legacy timer range when the operating mode is the first CE mode; define the one or more timers of the eNB for the UE according to an extended timer range when the operating mode is the second CE mode; and configure the eNB to operate the one or more defined timers based on the operating mode received from the CN.

Embodiment 11 includes the apparatus of embodiment 10, wherein the one or more processors are further configured to: define the one or more timers of the eNB according to the legacy timer range when the operating mode is a non-CE mode, wherein the operating mode further includes the non-CE mode.

Embodiment 12 includes the apparatus of embodiments 10 or 11, wherein, the first CE mode is associated with communications where a number of repetitions for each message used to receive and transmit messages between the eNB and the UE is within a first range; and the second CE mode is associated with communications where the number of repetitions for each message used to receive and transmit messages between the eNB and the UE is within a second range, wherein the second range is greater than the first range.

Embodiment 13 includes the apparatus of embodiment 10, wherein the one or more timers include one or more non-access stratum (NAS) layer timers, one or more access stratum (AS) layer timers, one or more control plane timers, or one or more radio resource control (RRC) timers.

Embodiment 14 includes the apparatus of embodiments 10 or 13, wherein the one or more timers include one or more level 2 or level 3 protocol stack timers.

Embodiment 15 includes the apparatus of embodiment 10, wherein when the eNB supports the second CE mode, the eNB also supports the first CE mode.

Embodiment 16 includes the apparatus of embodiment 10, wherein the one or more processors are further configured to: decode a UE capability message received from the UE indicating the CE mode supported by the UE; and encode the UE capability message for transmission to the CN indicating the CE mode supported by the UE.

Embodiment 17 includes the apparatus of embodiment 10, wherein the one or more timers are defined for a respective UE configuration or for a respective CN configuration.

Embodiment 18 includes an apparatus of a core network (CN) operable to support enhanced coverage for communicating data, the apparatus comprising memory; and one or more processors configured to: determine a coverage enhancement (CE) mode supported by an evolved NodeB (eNB) received in a eNB capability message; determine the coverage enhancement (CE) mode supported by a user equipment (UE) received in a UE capability message; determine an operating mode based upon the CE mode supported by the eNB and the CE mode supported by the UE; encode a UE configuration message including the operating mode for transmission to the UE, wherein the operating mode includes one of a first CE mode or a second CE mode; encode an eNB configuration message including the operating mode for transmission to the eNB; define one or more timers of the CN for the eNB and the UE according to a legacy timer range when the operating mode is the first CE mode; define the one or more timers of the CN for the eNB and the UE according to an extended timer range when the operating mode is the second CE mode; and configure the CN to operate the one or more defined timers based on the operating mode.

Embodiment 19 includes the apparatus of embodiment 18, wherein the apparatus of the CN includes a mobility management entity (MME) comprising: the memory; and the one or more processors configured to: determine the CE mode supported by the eNB; determine the CE mode supported by the UE; determine the operating mode; encode a UE configuration message including the operating mode for transmission to the UE; encode an eNB configuration message including the operating mode for transmission to the eNB; define the one or more timers of the CN for the eNB and the UE according to the legacy timer range when the operating mode is the first CE mode; define the one or more timers of the CN for the eNB and the UE according to the extended timer range when the operating mode is the second CE mode; and configure the CN to operate the one or more defined timers based on the operating mode.

Embodiment 20 includes the apparatus of embodiments 18 or 19, wherein the one or more processors are further configured to: define the one or more timers of the CN according to the legacy timer range when the operating mode is a non-CE mode.

Embodiment 21 includes the apparatus of embodiment 18, wherein, the first CE mode is associated with communications where a number of repetitions for each message used to receive and transmit messages between the eNB and the UE is within a first range; and the second CE mode is associated with communications where the number of repetitions for each message used to receive and transmit messages between the eNB and the UE is within a second range, wherein the second range is greater than the first range.

Embodiment 22 includes the apparatus of embodiments 18 or 19, wherein the one or more timers include one or more non-access stratum (NAS) layer timers, one or more access stratum (AS) layer timers, one or more control plane timers, one or more radio resource control (RRC) timers, one or more radio link control (RLC) timers, one or more packet data convergence protocol (PDCP) timers, or one or more random access channel (RACH) timers.

Embodiment 23 includes the apparatus of embodiments 18 or 19, wherein the one or more timers include one or more level 2 or level 3 protocol stack timers.

Embodiment 24 includes the apparatus of embodiments 18 or 19, wherein if the UE supports the second CE mode, the UE also supports the first CE mode.

Embodiment 25 includes the apparatus of embodiments 18 or 19, wherein if the eNB supports the second CE mode and the UE support the second CE mode, the CN is configured to support the second CE mode even if the operating mode of the UE is configured in the first CE mode.

Embodiment 26 includes the apparatus of embodiments 18 or 19, wherein determining the CE mode supported by the eNB includes decoding a message received from the eNB indicating the CE mode supported by the eNB.

Embodiment 27 includes the apparatus of embodiments 18 or 19, wherein determining the CE mode supported by the UE includes decoding a message received from the eNB indicating the CE mode supported by the UE.

Embodiment 28 includes the apparatus of embodiments 18 or 19, wherein determining the CE mode supported by the UE includes decoding a subscription information message in a container received from the eNB indicating the CE mode supported by the UE.

Embodiment 29 includes the apparatus of embodiments 18 or 19, wherein determining the CE mode supported by the eNB includes decoding a UE capability message in a container received from the eNB indicating the CE mode supported by the UE.

Embodiment 30 includes the apparatus of embodiments 18 or 19, wherein the one or more timers are defined for a respective UE configuration or for a respective CN configuration.

Embodiment 31 includes the apparatus of embodiment 18, wherein, the CN includes a mobility management entity (MME), serving gateway (S-GW), a public data network gateway (P-GW); and the one or more timers of the CN include one or more timers of the MME, S-GW, P-GW.

Embodiment 32 includes a user equipment (UE) operable to support enhanced coverage for communicating data comprising: a means for encoding a UE capability message including a coverage enhancement (CE) mode supported by the UE for transmission to an evolved NodeB (eNB) or a core node (CN); a means for decoding a UE configuration message indicating an operating mode received from the CN, wherein the operating mode includes one of a first CE mode or a second CE mode; a means for defining one or more timers of the UE according to a legacy timer range when the operating mode is the first CE mode; a means for defining the one or more timers of the UE according to an extended timer range when the operating mode is the second CE mode; and a means for configuring the UE to operate the one or more defined timers of the UE based on the operating mode received from the CN.

Embodiment 33 includes the apparatus of embodiment 32, further comprising: a means for defining the one or more timers of the UE according to the legacy timer range when the operating mode is a non-CE mode, wherein the operating mode further includes the non-CE mode.

Embodiment 34 includes the apparatus of embodiments 32 or 33, wherein, the first CE mode is associated with communications where a number of repetitions for each message used to receive and transmit messages between the UE and an evolved NodeB (eNB) is within a first range; and the second CE mode is associated with communications where the number of repetitions for each message used to receive and transmit messages between the UE and the eNB UE is within a second range, wherein the second range is greater than the first range.

Embodiment 35 includes the apparatus of embodiment 32, wherein the one or more timers include one or more radio link control (RLC) timers, one or more packet data convergence protocol (PDCP) timers, or one or more random access channel (RACH) timers.

Embodiment 36 includes the apparatus of embodiments 32 or 35, wherein the one or more timers include one or more level 2 or level 3 protocol stack timers.

Embodiment 37 includes the apparatus of embodiment 32, wherein when the UE supports the second CE mode the UE also supports the first CE mode.

Embodiment 38 includes the apparatus of embodiment 32, wherein the means for encoding a UE capability message including the CE mode supported by the UE for transmission to the eNB or the CN includes a means for encoding a subscription information message in a container.

Embodiment 39 includes the apparatus of embodiment 32, wherein the means for encoding a UE capability message including the CE mode supported by the UE for transmission to the eNB or a CN includes a means for encoding the UE capability message in a container.

Embodiment 40 includes the apparatus of embodiment 32, wherein the one or more timers are defined for a respective UE configuration or for a respective CN configuration.

Embodiment 41 includes an evolved NodeB (eNB) operable to support enhanced coverage for communicating data comprising: a means for encoding an eNB capability message including a coverage enhancement (CE) mode supported by the eNB for transmission to a core node (CN); a means for decoding a configuration message indicating an operating mode received from the CN, wherein the operating mode includes one of a first CE mode or a second CE mode; a means for defining one or more timers of the eNB for a user equipment (UE) according to a legacy timer range when the operating mode is the first CE mode; a means for defining the one or more timers of the eNB for the UE according to an extended timer range when the operating mode is the second CE mode; and a means for configuring the eNB to operate the one or more defined timers based on the operating mode received from the CN.

Embodiment 42 includes the apparatus of embodiment 41, further comprising: a means for defining the one or more timers of the eNB according to the legacy timer range when the operating mode is a non-CE mode, wherein the operating mode further includes the non-CE mode.

Embodiment 43 includes the apparatus of embodiments 41 or 42, wherein, the first CE mode is associated with communications where a number of repetitions for each message used to receive and transmit messages between the eNB and the UE is within a first range; and the second CE mode is associated with communications where the number of repetitions for each message used to receive and transmit messages between the eNB and the UE is within a second range, wherein the second range is greater than the first range.

Embodiment 44 includes the apparatus of embodiment 41, wherein the one or more timers include one or more non-access stratum (NAS) layer timers, one or more access stratum (AS) layer timers, one or more control plane timers, or one or more radio resource control (RRC) timers.

Embodiment 45 includes the apparatus of embodiment 41, wherein the one or more timers include one or more level 2 or level 3 protocol stack timers.

Embodiment 46 includes the apparatus of embodiments 41 or 44, wherein when the eNB supports the second CE mode, the eNB also supports the first CE mode.

Embodiment 47 includes the apparatus of embodiment 41, further comprising: a means for decoding a UE capability message received from the UE indicating the CE mode supported by the UE; and encode the UE capability message for transmission to the CN indicating the CE mode supported by the UE.

Embodiment 48 includes the apparatus of embodiment 41, wherein the one or more timers are defined for a respective UE configuration or for a respective CN configuration.

Embodiment 49 includes a core network (CN) operable to support enhanced coverage for communicating data comprising: a means for determining a coverage enhancement (CE) mode supported by an evolved NodeB (eNB) received in a eNB capability message; a means for determining the coverage enhancement (CE) mode supported by a user equipment (UE) received in a UE capability message; a means for determining an operating mode based upon the CE mode supported by the eNB and the CE mode supported by the UE; a means for encoding a UE configuration message including the operating mode for transmission to the UE, wherein the operating mode includes one of a first CE mode or a second CE mode; a means for encoding an eNB configuration message including the operating mode for transmission to the eNB; a means for defining one or more timers of the CN for the eNB and the UE according to a legacy timer range when the operating mode is the first CE mode; a means for defining the one or more timers of the CN for the eNB and the UE according to an extended timer range when the operating mode is the second CE mode; and a means for configuring the CN to operate the one or more defined timers based on the operating mode.

Embodiment 50 includes the apparatus of embodiment 49, wherein the apparatus of the CN includes a mobility management entity (MME) comprising: means for determining the CE mode supported by the eNB; determine the CE mode supported by the UE; means for determining the operating mode; means for encoding a UE configuration message including the operating mode for transmission to the UE; means for encoding an eNB configuration message including the operating mode for transmission to the eNB; means for defining the one or more timers of the CN for the eNB and the UE according to the legacy timer range when the operating mode is the first CE mode; means for defining the one or more timers of the CN for the eNB and the UE according to the extended timer range when the operating mode is the second CE mode; and means for configuring the CN to operate the one or more defined timers based on the operating mode.

Embodiment 51 includes the apparatus of embodiments 49 or 50, further comprising: a means for defining the one or more timers of the CN according to the legacy timer range when the operating mode is a non-CE mode.

Embodiment 52 includes the apparatus of embodiment 49, wherein, the first CE mode is associated with communications where a number of repetitions for each message used to receive and transmit messages between the eNB and the UE is within a first range; and the second CE mode is associated with communications where the number of repetitions for each message used to receive and transmit messages between the eNB and the UE is within a second range, wherein the second range is greater than the first range.

Embodiment 53 includes the apparatus of embodiments 49 or 50, wherein the one or more timers include one or more non-access stratum (NAS) layer timers, one or more access stratum (AS) layer timers, one or more control plane timers, one or more radio resource control (RRC) timers, one or more radio link control (RLC) timers, one or more packet data convergence protocol (PDCP) timers, or one or more random access channel (RACH) timers.

Embodiment 54 includes the apparatus of embodiments 49 or 50, wherein the one or more timers include one or more level 2 or level 3 protocol stack timers.

Embodiment 55 includes the apparatus of embodiments 49 or 50, wherein if the UE supports the second CE mode, the UE also supports the first CE mode.

Embodiment 56 includes the apparatus of embodiments 49 or 50, wherein if the eNB supports the second CE mode and the UE support the second CE mode, the CN is configured to support the second CE mode even if the operating mode of the UE is configured in the first CE mode.

Embodiment 57 includes the apparatus of embodiments 49 or 50, wherein the means for determining the CE mode supported by the eNB includes a means for decoding a message received from the eNB indicating the CE mode supported by the eNB.

Embodiment 58 includes the apparatus of embodiment 49, wherein the means for determining the CE mode supported by the UE includes a means for decoding a message received from the eNB indicating the CE mode supported by the UE.

Embodiment 59 includes the apparatus of embodiments 49 or 50, wherein the means for determining the CE mode supported by the UE includes a means for decoding a subscription information message in a container received from the eNB indicating the CE mode supported by the UE.

Embodiment 60 includes the apparatus of embodiments 49 or 50, wherein the means for determining the CE mode supported by the eNB includes a means for decoding a UE capability message in a container received from the eNB indicating the CE mode supported by the UE.

Embodiment 61 includes the apparatus of embodiments 49 or 50, wherein the one or more timers are defined for a respective UE configuration or for a respective CN configuration.

Embodiment 62 includes the apparatus of embodiment 49, wherein, the CN includes a mobility management entity (MME), serving gateway (S-GW), a public data network gateway (P-GW); and the one or more timers of the CN include one or more timers of the MME, S-GW, P-GW.

Embodiment 63 includes a coverage enhancement method for communicating data using a user equipment (UE) comprising: encoding a UE capability message including a coverage enhancement (CE) mode supported by the UE for transmission to an evolved NodeB (eNB) or a core node (CN); decoding a UE configuration message indicating an operating mode received from the CN, wherein the operating mode includes one of a first CE mode or a second CE mode; defining one or more timers of the UE according to a legacy timer range when the operating mode is the first CE mode; defining the one or more timers of the UE according to an extended timer range when the operating mode is the second CE mode; and configuring the UE to operate the one or more defined timers of the UE based on the operating mode received from the CN.

Embodiment 64 includes the method of embodiment 63, further comprising: defining the one or more timers of the UE according to the legacy timer range when the operating mode is a non-CE mode, wherein the operating mode further includes the non-CE mode.

Embodiment 65 includes the method of embodiments 63 or 64, wherein, the first CE mode is associated with communications where a number of repetitions for each message used to receive and transmit messages between the UE and an evolved NodeB (eNB) is within a first range; and the second CE mode is associated with communications where the number of repetitions for each message used to receive and transmit messages between the UE and the eNB UE is within a second range, wherein the second range is greater than the first range.

Embodiment 66 includes the method of embodiment 63, wherein the one or more timers include one or more radio link control (RLC) timers, one or more packet data convergence protocol (PDCP) timers, or one or more random access channel (RACH) timers.

Embodiment 67 includes the method of embodiments 63 or 66, wherein the one or more timers include one or more level 2 or level 3 protocol stack timers.

Embodiment 68 includes the method of embodiment 63, wherein when the UE supports the second CE mode the UE also supports the first CE mode.

Embodiment 69 includes the method of embodiment 63, wherein encoding the UE capability message including the CE mode supported by the UE for transmission to the eNB or the CN includes encoding a subscription information message in a container.

Embodiment 70 includes the method of embodiment 63, wherein encoding the UE capability message the CE mode supported by the UE for transmission to the eNB or a CN includes encoding the UE capability message in a container.

Embodiment 71 includes the method of embodiment 63, wherein the one or more timers are defined for a respective UE configuration or for a respective CN configuration.

Embodiment 72 includes a coverage enhancement method for communicating data using an evolved NodeB (eNB) comprising: encoding an eNB capability message including a coverage enhancement (CE) mode supported by the eNB for transmission to a core node (CN); decoding a configuration message indicating an operating mode received from the CN, wherein the operating mode includes one of a first CE mode or a second CE mode; defining one or more timers of the eNB for a user equipment (UE) according to a legacy timer range when the operating mode is the first CE mode; defining the one or more timers of the eNB for the UE according to an extended timer range when the operating mode is the second CE mode; and configuring the eNB to operate the one or more defined timers based on the operating mode received from the CN.

Embodiment 73 includes the method of embodiment 72, further comprising: defining the one or more timers of the eNB according to the legacy timer range when the operating mode is a non-CE mode, wherein the operating mode further includes the non-CE mode.

Embodiment 74 includes the method of embodiments 72 or 73, wherein, the first CE mode is associated with communications where a number of repetitions for each message used to receive and transmit messages between the eNB and the UE is within a first range; and the second CE mode is associated with communications where the number of repetitions for each message used to receive and transmit messages between the eNB and the UE is within a second range, wherein the second range is greater than the first range.

Embodiment 75 includes the method of embodiment 72, wherein the one or more timers include one or more non-access stratum (NAS) layer timers, one or more access stratum (AS) layer timers, one or more control plane timers, or one or more radio resource control (RRC) timers.

Embodiment 76 includes the method of embodiments 72 or 75, wherein the one or more timers include one or more level 2 or level 3 protocol stack timers.

Embodiment 77 includes the method of embodiment 72, wherein when the eNB supports the second CE mode, the eNB also supports the first CE mode.

Embodiment 78 includes the method of embodiment 72, further comprising: decoding a UE capability message received from the UE indicating the CE mode supported by the UE; and encoding the UE capability message for transmission to the CN indicating the CE mode supported by the UE.

Embodiment 79 includes the method of embodiment 72, wherein the one or more timers are defined for a respective UE configuration or for a respective CN configuration.

Embodiment 80 includes a coverage enhancement method for communicating data using a core network (CN) comprising: determining a coverage enhancement (CE) mode supported by an evolved NodeB (eNB) received in a eNB capability message; determining the coverage enhancement (CE) mode supported by a user equipment (UE) received in a UE capability message; determining an operating mode based upon the CE mode supported by the eNB and the CE mode supported by the UE; encoding a UE configuration message including the operating mode for transmission to the UE, wherein the operating mode includes one of a first CE mode or a second CE mode; encoding an eNB configuration message including the operating mode for transmission to the eNB; defining one or more timers of the CN for the eNB and the UE according to a legacy timer range when the operating mode is the first CE mode; defining the one or more timers of the CN for the eNB and the UE according to an extended timer range when the operating mode is the second CE mode; and configuring the CN to operate the one or more defined timers based on the operating mode.

Embodiment 81 includes the method of embodiment 80, further comprising: determining by a mobility management entity (MME) the CE mode supported by the eNB; determining the CE mode supported by the UE; determining by the MME the operating mode; encoding by the MME a UE configuration message including the operating mode for transmission to the UE; encoding by the MME an eNB configuration message including the operating mode for transmission to the eNB; defining by the MME the one or more timers of the CN for the eNB and the UE according to the legacy timer range when the operating mode is the first CE mode; defining by the MME the one or more timers of the CN for the eNB and the UE according to the extended timer range when the operating mode is the second CE mode; and configuring by the MME the CN to operate the one or more defined timers based on the operating mode.

Embodiment 82 includes the method of embodiments 80 or 81, further comprising: defining the one or more timers of the CN according to the legacy timer range when the operating mode is a non-CE mode.

Embodiment 83 includes the method of embodiment 80, wherein, the first CE mode is associated with communications where a number of repetitions for each message used to receive and transmit messages between the eNB and the UE is within a first range; and the second CE mode is associated with communications where the number of repetitions for each message used to receive and transmit messages between the eNB and the UE is within a second range, wherein the second range is greater than the first range.

Embodiment 84 includes the method of embodiments 80 or 81, wherein the one or more timers include one or more non-access stratum (NAS) layer timers, one or more access stratum (AS) layer timers, one or more control plane timers, one or more radio resource control (RRC) timers, one or more radio link control (RLC) timers, one or more packet data convergence protocol (PDCP) timers, or one or more random access channel (RACH) timers.

Embodiment 85 includes the method of embodiments 80 or 81, wherein the one or more timers include one or more level 2 or level 3 protocol stack timers.

Embodiment 86 includes the method of embodiments 80 or 81, wherein if the UE supports the second CE mode, the UE also supports the first CE mode.

Embodiment 87 includes the method of embodiments 80 or 81, wherein if the eNB supports the second CE mode and the UE support the second CE mode, the CN is configured to support the second CE mode even if the operating mode of the UE is configured in the first CE mode.

Embodiment 88 includes the method of embodiments 80 or 81, wherein determining the CE mode supported by the eNB includes decoding a message received from the eNB indicating the CE mode supported by the eNB.

Embodiment 89 includes the method of embodiments 80 or 81, wherein determining the CE mode supported by the UE includes decoding a message received from the eNB indicating the CE mode supported by the UE.

Embodiment 90 includes the method of embodiments 80 or 81, wherein determining the CE mode supported by the UE includes decoding a subscription information message in a container received from the eNB indicating the CE mode supported by the UE.

Embodiment 91 includes the method of embodiments 80 or 81, wherein determining the CE mode supported by the eNB includes decoding a UE capability message in a container received from the eNB indicating the CE mode supported by the UE.

Embodiment 92 includes the method of embodiments 80 or 81, wherein the one or more timers are defined for a respective UE configuration or for a respective CN configuration.

Embodiment 93 includes the apparatus of embodiment 80, wherein, the CN includes a mobility management entity (MME), serving gateway (S-GW), a public data network gateway (P-GW); and the one or more timers of the CN include one or more timers of the MME, S-GW, P-GW.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to support enhanced coverage for communicating data, the apparatus comprising:
    memory; and
    one or more processors configured to:
        encode, at the UE, a UE capability message including a coverage enhancement (CE) mode supported by the UE for transmission to an evolved NodeB (eNB) or a core node (CN);
        decode, at the UE, a UE configuration message indicating an operating mode received from the CN, wherein the operating mode includes one of a first CE mode or a second CE mode;
        define, at the UE, one or more timers of the UE according to a legacy timer range when the operating mode is the first CE mode;
        define, at the UE, the one or more timers of the UE according to an extended timer range when the operating mode is the second CE mode; and
        configure, at the UE, the UE to operate the one or more defined timers of the UE based on the operating mode received from the CN.

2. The apparatus of claim 1, wherein the one or more processors are further configured to:
    define the one or more timers of the UE according to the legacy timer range when the operating mode is a non-CE mode, wherein the operating mode further includes the non-CE mode.

3. The apparatus of claim 1, wherein,
    the first CE mode is associated with communications where a number of repetitions for each message used to receive and transmit messages between the UE and an evolved NodeB (eNB) is within a first range; and
    the second CE mode is associated with communications where the number of repetitions for each message used to receive and transmit messages between the UE and the eNB UE is within a second range, wherein the second range is greater than the first range.

4. The apparatus of claim 1, wherein the one or more timers include one or more radio link control (RLC) timers, one or more packet data convergence protocol (PDCP) timers, or one or more random access channel (RACH) timers.

5. The apparatus of claim 1, wherein the one or more timers include one or more level 2 or level 3 protocol stack timers.

6. The apparatus of claim 1, wherein when the UE supports the second CE mode the UE also supports the first CE mode.

7. The apparatus of claim 1, wherein encoding the UE capability message including the CE mode supported by the UE for transmission to the eNB or the CN includes encoding a subscription information message in a container.

8. The apparatus of claim 1, wherein encoding the UE capability message including the CE mode supported by the UE for transmission to the eNB or a CN includes encoding the UE capability message in a container.

9. The apparatus of claim 1, wherein the one or more timers are defined for a respective UE configuration or for a respective CN configuration.

10. An apparatus of an evolved NodeB (eNB) operable to support enhanced coverage for communicating data, the apparatus comprising:
  memory; and
  one or more processors configured to:
    encode, at the eNB an eNB capability message including a coverage enhancement (CE) mode supported by the eNB for transmission to a core node (CN);
    decode, at the eNB, a configuration message indicating an operating mode received from the CN, wherein the operating mode includes one of a first CE mode or a second CE mode;
    define, at the eNB, one or more timers of the eNB for a user equipment (UE) according to a legacy timer range when the operating mode is the first CE mode;
    define, at the eNB, the one or more timers of the eNB for the UE according to an extended timer range when the operating mode is the second CE mode; and
    configure, at the eNB, the eNB to operate the one or more defined timers based on the operating mode received from the CN.

11. The apparatus of claim 10, wherein the one or more processors are further configured to:
  define the one or more timers of the eNB according to the legacy timer range when the operating mode is a non-CE mode, wherein the operating mode further includes the non-CE mode.

12. The apparatus of claim 10, wherein,
  the first CE mode is associated with communications where a number of repetitions for each message used to receive and transmit messages between the eNB and the UE is within a first range; and
  the second CE mode is associated with communications where the number of repetitions for each message used to receive and transmit messages between the eNB and the UE is within a second range, wherein the second range is greater than the first range.

13. The apparatus of claim 10, wherein the one or more timers include one or more non-access stratum (NAS) layer timers, one or more access stratum (AS) layer timers, one or more control plane timers, or one or more radio resource control (RRC) timers.

14. The apparatus of claim 10, wherein the one or more timers include one or more level 2 or level 3 protocol stack timers.

15. The apparatus of claim 10, wherein when the eNB supports the second CE mode, the eNB also supports the first CE mode.

16. The apparatus of claim 10, wherein the one or more processors are further configured to:
  decode a UE capability message received from the UE indicating the CE mode supported by the UE; and
  encode the UE capability message for transmission to the CN indicating the CE mode supported by the UE.

17. The apparatus of claim 10, wherein the one or more timers are defined for a respective UE configuration or for a respective CN configuration.

18. An apparatus of a core network (CN) operable to support enhanced coverage for communicating data, the apparatus comprising:
  memory; and
  one or more processors configured to:
    determine, at the CN, a coverage enhancement (CE) mode supported by an evolved NodeB (eNB) received in a eNB capability message;
    determine, at the CN, the coverage enhancement (CE) mode supported by a user equipment (UE) received in a UE capability message;
    determine, at the CN, an operating mode based upon the CE mode supported by the eNB and the CE mode supported by the UE;
    encode, at the CN, a UE configuration message including the operating mode for transmission to the UE, wherein the operating mode includes one of a first CE mode or a second CE mode;
    encode, at the CN, an eNB configuration message including the operating mode for transmission to the eNB;
    define, at the CN, one or more timers of the CN for the eNB and the UE according to a legacy timer range when the operating mode is the first CE mode;
    define, at the CN, the one or more timers of the CN for the eNB and the UE according to an extended timer range when the operating mode is the second CE mode; and
    configure, at the CN, the CN to operate the one or more defined timers based on the operating mode.

19. The apparatus of claim 18, wherein the apparatus of the CN includes a mobility management entity (MME) comprising:
  the memory; and
  the one or more processors configured to:
    determine the CE mode supported by the eNB;
    determine the CE mode supported by the UE; determine the operating mode;
    encode a UE configuration message including the operating mode for transmission to the UE;
    encode an eNB configuration message including the operating mode for transmission to the eNB;
    define the one or more timers of the CN for the eNB and the UE according to the legacy timer range when the operating mode is the first CE mode;
    define the one or more timers of the CN for the eNB and the UE according to the extended timer range when the operating mode is the second CE mode; and
    configure the CN to operate the one or more defined timers based on the operating mode.

20. The apparatus of claim 18, wherein the one or more processors are further configured to:
  define the one or more timers of the CN according to the legacy timer range when the operating mode is a non-CE mode.

21. The apparatus of claim 18, wherein,
  the first CE mode is associated with communications where a number of repetitions for each message used to receive and transmit messages between the eNB and the UE is within a first range; and
  the second CE mode is associated with communications where the number of repetitions for each message used to receive and transmit messages between the eNB and the UE is within a second range, wherein the second range is greater than the first range.

22. The apparatus of claim 18, wherein the one or more timers include one or
  more non-access stratum (NAS) layer timers, one or more access stratum (AS) layer timers, one or more control plane timers, one or more radio resource control (RRC) timers, one or more radio link control (RLC) timers, one or more packet data convergence protocol (PDCP) timers, or one or more random access channel (RACH) timers.

23. The apparatus of claim 18, wherein the one or more timers include one or more level 2 or level 3 protocol stack timers.

24. The apparatus of claim 18, wherein if the UE supports the second CE mode, the UE also supports the first CE mode.

25. The apparatus of claim 18, wherein if the eNB supports the second CE mode and the UE support the second CE mode, the CN is configured to support the second CE mode even if the operating mode of the UE is configured in the first CE mode.

26. The apparatus of claim 18, wherein determining the CE mode supported by the eNB includes decoding a message received from the eNB indicating the CE mode supported by the eNB.

27. The apparatus of claim 18, wherein determining the CE mode supported by the UE includes decoding a message received from the eNB indicating the CE mode supported by the UE.

28. The apparatus of claim 18, wherein determining the CE mode supported by the UE includes decoding a subscription information message in a container received from the eNB indicating the CE mode supported by the UE.

29. The apparatus of claim 18, wherein determining the CE mode supported by the eNB includes decoding a UE capability message in a container received from the eNB indicating the CE mode supported by the UE.

30. The apparatus of claim 18, wherein the one or more timers are defined for a respective UE configuration or for a respective CN configuration.

31. The apparatus of claim 18, wherein,
the CN includes a mobility management entity (MME), serving gateway (S-GW), a public data network gateway (P-GW); and
the one or more timers of the CN include one or more timers of the MME, S-GW, P-GW.

\* \* \* \* \*